US00RE45254E

(19) United States
(12) Reissued Patent
Roskind

(10) Patent Number: US RE45,254 E
(45) Date of Reissued Patent: *Nov. 18, 2014

(54) IMPLICIT POPULATION OF ACCESS CONTROL LISTS

(71) Applicant: Facebook, Inc., Menlo Park, CA (US)

(72) Inventor: James A. Roskind, Redwood City, CA (US)

(73) Assignee: Facebook, Inc., Menlo Park, CA (US)

( * ) Notice: This patent is subject to a terminal disclaimer.

(21) Appl. No.: 13/907,761

(22) Filed: May 31, 2013

Related U.S. Patent Documents

Reissue of:
(64) Patent No.: 7,954,146
Issued: May 31, 2011
Appl. No.: 12/349,161
Filed: Jan. 6, 2009

U.S. Applications:
(63) Continuation of application No. 11/782,461, filed on Jul. 24, 2007, now Pat. No. 7,490,238, which is a continuation of application No. 10/334,142, filed on Dec. 31, 2002, now Pat. No. 7,263,614.

(51) Int. Cl.
*G06F 17/00* (2006.01)
*H04L 9/32* (2006.01)
*H04L 12/28* (2006.01)

(52) U.S. Cl.
USPC ..... 726/15; 713/168; 713/170; 370/351

(58) Field of Classification Search
None
See application file for complete search history.

(56) References Cited

U.S. PATENT DOCUMENTS

| | | | |
|---|---|---|---|
| 4,837,798 | A | 6/1989 | Cohen et al. |
| 5,086,394 | A | 2/1992 | Shapira |
| 5,276,905 | A | 1/1994 | Hurst et al. |
| 5,327,486 | A | 7/1994 | Wolff et al. |
| 5,548,637 | A | 8/1996 | Heller et al. |
| 5,553,110 | A | 9/1996 | Sentoku et al. |
| 5,557,659 | A | 9/1996 | Hyde-Thomson |
| 5,583,920 | A | 12/1996 | Wheeler, Jr. |

(Continued)

FOREIGN PATENT DOCUMENTS

| | | |
|---|---|---|
| EP | 0862304 | 9/1998 |
| EP | 1176840 | 1/2002 |

(Continued)

OTHER PUBLICATIONS

U.S. Appl. No. 13/619,312, filed Sep. 14, 2012, Appleman.

(Continued)

*Primary Examiner* — William Powers
(74) *Attorney, Agent, or Firm* — Keller Jolley Preece

(57) ABSTRACT

Communication applications may include lists of users with which a user of the application communicates. If two users of a communications application each include the other user on their user lists, an implicit trust may be established between the users. For example, if user A includes user B in her list and user B includes user A in his list, then it may be determined that each user knows and/or trusts the other user. As a result, a connection or communications pathway may be automatically created between the client devices of the users to facilitate communications between the users based on the implicit trust.

33 Claims, 6 Drawing Sheets

(56) References Cited

U.S. PATENT DOCUMENTS 5,608,786 A 3/1997 Gordon
5,610,910 A 3/1997 Focsaneanu et al.
5,650,994 A 7/1997 Daley
5,694,616 A 12/1997 Johnson et al.
5,721,906 A 2/1998 Siefert
5,742,905 A 4/1998 Pepe et al.
5,764,916 A 6/1998 Busey et al.
5,774,670 A 6/1998 Montulli
5,790,800 A 8/1998 Gauvin et al.
5,793,365 A 8/1998 Tang et al.
5,802,470 A 9/1998 Gaulke et al.
5,835,724 A 11/1998 Smith
5,848,134 A 12/1998 Sekiguchi et al.
5,850,594 A 12/1998 Cannon et al.
5,859,979 A 1/1999 Tung et al.
5,867,162 A 2/1999 O'Leary et al.
5,870,744 A 2/1999 Sprague
5,872,521 A 2/1999 Lopatukin et al.
5,878,219 A 3/1999 Vance, Jr. et al.
5,893,091 A 4/1999 Hunt et al.
5,893,099 A 4/1999 Schreiber et al.
5,919,247 A 7/1999 Van Hoff et al.
5,920,692 A 7/1999 Nguyen et al.
5,940,488 A 8/1999 DeGrazia et al.
5,946,617 A 8/1999 Portaro et al.
5,948,058 A 9/1999 Kudoh et al.
5,951,643 A 9/1999 Shelton et al.
5,951,646 A 9/1999 Brandon
5,951,652 A 9/1999 Ingrassia, Jr. et al.
5,954,798 A 9/1999 Shelton et al.
5,956,716 A 9/1999 Kenner et al.
5,960,173 A 9/1999 Tang et al.
5,983,369 A 11/1999 Bakoglu et al.
5,987,113 A 11/1999 James
5,987,407 A 11/1999 Wu et al.
5,991,791 A 11/1999 Siefert
5,995,023 A 11/1999 Kreft
6,002,402 A 12/1999 Schacher
6,006,179 A 12/1999 Wu et al.
6,009,413 A 12/1999 Webber et al.
6,012,051 A 1/2000 Sammon, Jr. et al.
6,014,135 A 1/2000 Fernandes
6,014,638 A 1/2000 Burge et al.
6,026,403 A 2/2000 Siefert
6,026,429 A 2/2000 Jones et al.
6,049,533 A 4/2000 Norman et al.
6,065,047 A 5/2000 Carpenter et al.
6,070,171 A 5/2000 Snyder et al.
6,073,138 A 6/2000 De I'Etraz et al.
6,081,830 A 6/2000 Schindler
6,085,223 A 7/2000 Carino, Jr. et al.
6,088,435 A 7/2000 Barber et al.
6,112,181 A 8/2000 Shear et al.
6,134,432 A 10/2000 Holmes et al.
6,144,991 A 11/2000 England
6,151,584 A 11/2000 Papierniak et al.
6,161,130 A 12/2000 Horvitz et al.
6,166,730 A 12/2000 Goode et al.
6,175,831 B1 1/2001 Weinreich et al.
6,192,395 B1 2/2001 Lemer et al.
6,195,354 B1 2/2001 Skalecki et al.
6,199,103 B1 3/2001 Sakaguchi et al.
6,212,548 B1 4/2001 DeSimone et al.
6,212,550 B1 4/2001 Segur
6,223,213 B1 4/2001 Cleron et al.
6,233,577 B1 5/2001 Rasasubramani et al.
6,247,043 B1 6/2001 Bates et al.
6,249,740 B1 6/2001 Ito et al.
6,260,148 B1 7/2001 Aggarwal et al.
6,269,369 B1 7/2001 Robertson
6,301,609 B1 10/2001 Aravamudan et al.
6,311,211 B1 10/2001 Shaw et al.
6,314,450 B1 11/2001 Hachiya et al.
6,317,776 B1 11/2001 Broussard et al.
6,324,541 B1 11/2001 De I'Etraz et al.
6,330,590 B1 12/2001 Cotten
6,347,332 B1 2/2002 Malet et al.
6,349,327 B1 2/2002 Tang et al.
6,351,698 B1 2/2002 Kubota et al.
6,363,392 B1 3/2002 Halstead et al.
6,366,962 B1 * 4/2002 Teibel ..... 709/245
6,374,246 B1 4/2002 Matsuo
6,374,290 B1 4/2002 Scharber et al.
6,389,127 B1 5/2002 Vardi et al.
6,389,372 B1 5/2002 Glance et al.
6,393,464 B1 5/2002 Dieterman
6,400,381 B1 6/2002 Barrett et al.
6,405,035 B1 6/2002 Singh
6,405,249 B1 6/2002 Matsuda et al.
6,415,318 B1 7/2002 Aggarwal et al.
6,421,439 B1 7/2002 Liffick
6,421,675 B1 7/2002 Ryan
6,421,709 B1 7/2002 McCormick et al.
6,425,012 B1 7/2002 Trovato et al.
6,430,344 B1 8/2002 Dixon et al.
6,430,604 B1 8/2002 Ogle et al.
6,446,112 B1 9/2002 Bunney et al.
6,449,344 B1 9/2002 Goldfinger et al.
6,449,634 B1 9/2002 Capiel
6,480,885 B1 11/2002 Olivier
6,484,196 B1 11/2002 Maurille
6,501,834 B1 12/2002 Milewski et al.
6,507,866 B1 1/2003 Barchi
6,525,747 B1 2/2003 Bezos
6,529,475 B1 3/2003 Wan et al.
6,535,586 B1 3/2003 Cloutier et al.
6,539,421 B1 3/2003 Appelman et al.
6,542,750 B2 4/2003 Hendrey et al.
6,549,937 B1 4/2003 Auerbach et al.
6,557,027 B1 4/2003 Cragun
6,559,863 B1 5/2003 Megiddo
6,564,248 B1 5/2003 Budge et al.
6,564,261 B1 5/2003 Gudjonsson et al.
6,571,234 B1 5/2003 Knight et al.
6,574,599 B1 6/2003 Lim et al.
6,580,790 B1 6/2003 Henry et al.
6,606,647 B2 8/2003 Shah et al.
6,615,241 B1 9/2003 Miller et al.
6,636,733 B1 10/2003 Helferich
6,640,218 B1 10/2003 Golding
6,640,230 B1 10/2003 Alexander et al.
6,647,383 B1 11/2003 August
6,654,683 B2 11/2003 Jin et al.
6,677,968 B1 1/2004 Appelman
6,677,976 B2 1/2004 Parker et al.
6,678,719 B1 1/2004 Stimmel
6,691,162 B1 2/2004 Wick
6,697,807 B2 2/2004 McGeachie
6,701,348 B2 3/2004 Sommerer
6,714,791 B2 3/2004 Friedman
6,714,793 B1 3/2004 Carey et al.
6,714,916 B1 3/2004 Robertson et al.
6,731,308 B1 5/2004 Tang et al.
6,732,155 B2 5/2004 Meek
6,738,822 B2 5/2004 Fukasawa et al.
6,747,970 B1 6/2004 Lamb et al.
6,748,421 B1 6/2004 Ozkan et al.
6,750,881 B1 6/2004 Appelman
6,757,365 B1 6/2004 Bogard
6,757,732 B1 6/2004 Sollee et al.
6,772,188 B1 8/2004 Cloutier
6,781,608 B1 8/2004 Crawford
6,785,554 B1 8/2004 Amerga
6,785,681 B2 8/2004 Keskar et al.
6,788,769 B1 9/2004 Waites
6,795,863 B1 9/2004 Doty
6,799,039 B2 9/2004 Wu et al.
6,800,031 B2 10/2004 Di Cesare
6,807,574 B1 10/2004 Partovi et al.
6,816,578 B1 * 11/2004 Kredo et al. ..... 379/88.17
6,832,245 B1 12/2004 Isaacs
6,839,737 B1 1/2005 Friskel
6,857,006 B1 2/2005 Nishizawa
6,879,665 B1 4/2005 Cook et al.

(56) References Cited

U.S. PATENT DOCUMENTS 6,901,559 B1 5/2005 Blum
6,904,026 B1 6/2005 Tarnanen et al.
6,907,243 B1 6/2005 Patel
6,912,563 B1 6/2005 Parker et al.
6,912,564 B1 6/2005 Appelman et al.
6,917,965 B2 7/2005 Gupta et al.
6,920,478 B2 7/2005 Mendiola et al.
6,941,345 B1 9/2005 Kapil
6,968,179 B1 11/2005 De Vries
6,990,513 B2 * 1/2006 Belfiore et al. ..... 709/203
6,993,327 B2 * 1/2006 Mathis ..... 455/414.1
6,993,564 B2 1/2006 Whitten, II
6,996,520 B2 2/2006 Levin
7,035,865 B2 4/2006 Doss et al.
7,039,639 B2 5/2006 Brezin
7,039,676 B1 5/2006 Day et al.
7,043,530 B2 5/2006 Isaacs et al.
7,058,036 B1 6/2006 Yu et al.
7,058,690 B2 6/2006 Maehiro
7,065,186 B1 6/2006 Myers et al.
7,082,047 B2 7/2006 Chow
7,082,407 B1 7/2006 Bezos et al.
7,085,834 B2 8/2006 Delany et al.
7,117,254 B2 10/2006 Lunt et al.
7,120,687 B1 10/2006 Tessman, Jr. et al.
7,124,123 B1 10/2006 Roskind et al.
7,127,232 B2 10/2006 O'Neil et al.
7,162,202 B2 1/2007 Westman
7,171,473 B1 1/2007 Eftis et al.
7,177,880 B2 2/2007 Ruvolo et al.
7,181,498 B2 2/2007 Zhu et al.
7,185,059 B2 2/2007 Daniell et al.
7,188,153 B2 3/2007 Lunt et al.
7,190,956 B2 3/2007 Dorenbosch et al.
7,200,634 B2 4/2007 Mendiola et al.
7,202,814 B2 4/2007 Caspi et al.
7,222,156 B2 5/2007 Gupta et al.
7,233,992 B1 6/2007 Muldoon et al.
7,263,614 B2 8/2007 Roskind
7,269,590 B2 9/2007 Hull et al.
7,275,215 B2 9/2007 Werndorfer
7,283,805 B2 * 10/2007 Agrawal ..... 455/412.2
7,313,760 B2 12/2007 Grossman et al.
7,316,028 B2 * 1/2008 Donatelli et al. ..... 726/11
7,436,780 B2 10/2008 Stephens et al.
7,437,413 B2 10/2008 Okuyama et al.
7,454,470 B1 11/2008 Isaacs et al.
7,490,238 B2 2/2009 Roskind
7,711,106 B2 5/2010 Likwornik
7,716,287 B2 5/2010 Appelman
7,774,711 B2 8/2010 Valeski
7,945,674 B2 5/2011 Appelman
7,949,759 B2 5/2011 Appelman
7,954,146 B2 5/2011 Roskind
8,060,566 B2 11/2011 Appleman
8,185,638 B2 5/2012 Appelman
8,560,706 B2 10/2013 Appelman
2001/0002469 A1 5/2001 Bates et al.
2001/0005861 A1 6/2001 Mousseau et al.
2001/0013050 A1 8/2001 Shah
2001/0032246 A1 10/2001 Fardella et al.
2001/0052019 A1 12/2001 Walters et al.
2002/0015061 A1 2/2002 Maguire
2002/0021307 A1 2/2002 Glenn et al.
2002/0023132 A1 2/2002 Tornabene et al.
2002/0023134 A1 2/2002 Roskowski et al.
2002/0028595 A1 3/2002 Higashi et al.
2002/0042816 A1 4/2002 Bae
2002/0049717 A1 4/2002 Routtenberg et al.
2002/0055975 A1 * 5/2002 Petrovykh ..... 709/205
2002/0056123 A1 5/2002 Liwerant et al.
2002/0059201 A1 5/2002 Work
2002/0065856 A1 5/2002 Kisiel
2002/0065894 A1 5/2002 Dalal et al.
2002/0077080 A1 6/2002 Greene
2002/0083136 A1 * 6/2002 Whitten, II ..... 709/205
2002/0086732 A1 * 7/2002 Kirmse et al. ..... 463/42
2002/0091667 A1 7/2002 Jaipuria et al.
2002/0103801 A1 8/2002 Lyons
2002/0112181 A1 8/2002 Smith
2002/0116463 A1 8/2002 Hart
2002/0116641 A1 8/2002 Mastrianni
2002/0133292 A1 9/2002 Miyaki
2002/0133369 A1 9/2002 Johnson
2002/0147777 A1 10/2002 Hackbarth et al.
2002/0174010 A1 11/2002 Rice, III
2002/0175953 A1 11/2002 Lin
2002/0178161 A1 11/2002 Brezin
2002/0181703 A1 12/2002 Logan et al.
2002/0184089 A1 12/2002 Tsou et al.
2002/0193942 A1 12/2002 Odakura et al.
2002/0199095 A1 12/2002 Bandini et al.
2003/0004855 A1 1/2003 Dutta et al.
2003/0004872 A1 1/2003 Gardi et al.
2003/0009385 A1 1/2003 Tucciarone et al.
2003/0009523 A1 1/2003 Lindskog et al.
2003/0018726 A1 1/2003 Low et al.
2003/0023875 A1 1/2003 Hursey et al.
2003/0028524 A1 2/2003 Keskar et al.
2003/0028595 A1 2/2003 Vogt et al.
2003/0037112 A1 2/2003 Fitzpatrick et al.
2003/0043201 A1 3/2003 Abdelhadi et al.
2003/0046198 A1 3/2003 Knapp et al.
2003/0050916 A1 3/2003 Ortega et al.
2003/0055831 A1 3/2003 Ryan
2003/0065721 A1 4/2003 Roskind
2003/0084103 A1 5/2003 Weiner et al.
2003/0088554 A1 5/2003 Ryan
2003/0093483 A1 5/2003 Allen et al.
2003/0093580 A1 5/2003 Thomas et al.
2003/0101226 A1 5/2003 Quine
2003/0105822 A1 6/2003 Gusler et al.
2003/0131061 A1 7/2003 Newton et al.
2003/0140103 A1 7/2003 Szeto et al.
2003/0167324 A1 9/2003 Farnham et al.
2003/0172349 A1 9/2003 Katayama
2003/0182394 A1 9/2003 Ryngler et al.
2003/0187813 A1 10/2003 Goldman et al.
2003/0212804 A1 11/2003 Hashemi
2003/0225847 A1 12/2003 Heikes et al.
2003/0233416 A1 * 12/2003 Beyda ..... 709/206
2003/0236835 A1 12/2003 Levi et al.
2004/0015548 A1 1/2004 Lee
2004/0015553 A1 1/2004 Griffin et al.
2004/0054729 A1 3/2004 Fukuizumi et al.
2004/0054736 A1 3/2004 Daniell
2004/0056901 A1 3/2004 March et al.
2004/0117443 A1 6/2004 Barsness
2004/0122681 A1 6/2004 Ruvolo
2004/0122810 A1 6/2004 Mayer
2004/0122855 A1 6/2004 Ruvolo
2004/0128322 A1 7/2004 Nagy
2004/0128356 A1 7/2004 Bernstein et al.
2004/0179039 A1 9/2004 Blattner et al.
2004/0186738 A1 9/2004 Reisman
2004/0201624 A1 10/2004 Crawford
2004/0210844 A1 10/2004 Pettinati et al.
2004/0215648 A1 10/2004 Marshall
2004/0215721 A1 10/2004 Szeto et al.
2004/0215793 A1 10/2004 Ryan et al.
2004/0221309 A1 11/2004 Zaner
2004/0260762 A1 12/2004 Fish
2005/0004989 A1 1/2005 Satterfield et al.
2005/0015432 A1 1/2005 Cohen
2005/0021750 A1 1/2005 Abrams
2005/0027382 A1 2/2005 Kirmse et al.
2005/0038688 A1 2/2005 Collins et al.
2005/0038856 A1 2/2005 Krishnasamy
2005/0043989 A1 2/2005 Shifrin
2005/0044152 A1 2/2005 Hardy et al.
2005/0050143 A1 3/2005 Guster et al.
2005/0055416 A1 3/2005 Heikes et al.
2005/0055450 A1 3/2005 Gang
2005/0060377 A1 3/2005 Lo et al.

(56) References Cited

U.S. PATENT DOCUMENTS

| | | | |
|---|---|---|---|
| 2005/0076240 | A1 | 4/2005 | Appleman |
| 2005/0076241 | A1 | 4/2005 | Appelman |
| 2005/0080859 | A1 | 4/2005 | Lake |
| 2005/0080863 | A1 | 4/2005 | Daniell |
| 2005/0086211 | A1 | 4/2005 | Mayer |
| 2005/0091311 | A1 | 4/2005 | Lund et al. |
| 2005/0102202 | A1 | 5/2005 | Linden et al. |
| 2005/0102257 | A1 | 5/2005 | Onyon et al. |
| 2005/0114229 | A1 | 5/2005 | Ackley et al. |
| 2005/0153681 | A1 | 7/2005 | Hanson |
| 2005/0154913 | A1 | 7/2005 | Barriga et al. |
| 2005/0171799 | A1 | 8/2005 | Hull et al. |
| 2005/0177486 | A1 | 8/2005 | Yeager |
| 2005/0197846 | A1 | 9/2005 | Pezaris |
| 2005/0198131 | A1 | 9/2005 | Appelman |
| 2005/0198172 | A1 | 9/2005 | Appelman |
| 2005/0198173 | A1 | 9/2005 | Evans |
| 2005/0198268 | A1 | 9/2005 | Chandra |
| 2005/0216300 | A1 | 9/2005 | Appelman et al. |
| 2005/0246420 | A1 | 11/2005 | Little, II |
| 2006/0031366 | A1 | 2/2006 | Dolph |
| 2006/0031772 | A1 | 2/2006 | Valeski |
| 2006/0075044 | A1 | 4/2006 | Fox et al. |
| 2006/0129678 | A1 | 6/2006 | Morita |
| 2006/0167991 | A1 | 7/2006 | Heikes et al. |
| 2006/0168054 | A1 | 7/2006 | Burkhart et al. |
| 2006/0173824 | A1 | 8/2006 | Bensky et al. |
| 2006/0173963 | A1 | 8/2006 | Roseway et al. |
| 2006/0182248 | A1 | 8/2006 | Smith et al. |
| 2006/0190536 | A1 | 8/2006 | Strong et al. |
| 2006/0212561 | A1 | 9/2006 | Feng |
| 2006/0248573 | A1 | 11/2006 | Pannu et al. |
| 2006/0277187 | A1 | 12/2006 | Roese et al. |
| 2007/0156664 | A1 | 7/2007 | Norton et al. |
| 2007/0250566 | A1 | 10/2007 | Appelman |
| 2007/0271607 | A1 | 11/2007 | Roskind |
| 2008/0082620 | A1 | 4/2008 | Barsness |
| 2008/0115087 | A1 | 5/2008 | Rollin et al. |
| 2008/0186164 | A1 | 8/2008 | Emigh et al. |
| 2008/0228598 | A1 | 9/2008 | Leff et al. |
| 2008/0255989 | A1 | 10/2008 | Altberg et al. |
| 2009/0043844 | A1 | 2/2009 | Zimmet et al. |
| 2009/0070306 | A1 | 3/2009 | Stroe |
| 2009/0089316 | A1 | 4/2009 | Kogan et al. |
| 2010/0205546 | A1 | 8/2010 | Appelman |
| 2010/0325113 | A1 | 12/2010 | Valeski |
| 2012/0005078 | A1 | 1/2012 | Pitroda et al. |
| 2013/0073556 | A1 | 3/2013 | Valeski |
| 2013/0080529 | A1 | 3/2013 | Appelman |
| 2014/0108571 | A1 | 4/2014 | Appelman |

FOREIGN PATENT DOCUMENTS

| | | |
|---|---|---|
| GB | 2319137 | 5/1998 |
| GB | 2357932 | 4/2001 |
| GB | 2368747 | 8/2002 |
| JP | 2008-314826 | 11/1996 |
| JP | 2000-499001 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 6/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |
| WO | WO 02/35781 | 5/2002 |
| WO | WO 02/062039 | 8/2002 |
| WO | WO 02/073886 | 9/2002 |
| WO | WO 2004/28178 | 4/2004 |
| WO | WO 2005/086723 | 9/2005 |
| WO | WO 2005/089286 | 9/2005 |
| WO | WO 2006/068955 | 6/2006 |

OTHER PUBLICATIONS

U.S. Appl. No. 13/619,364, filed Sep. 14, 2012, Appleman.

U.S. Appl. No. 13/619,397, filed Sep. 14, 2012, Appleman.

"A Reputation System for Peer-to-Peer Networks," Gupta et al., Jun. 1-3, 2003, NOSSDAV'03, Monterey, California, pp. 144-152.

"About File Transfers", AOL Instant Messenger, version 4.3, Help Documentation, available on Jul. 21, 2001, 5 pages.

"About Internet directory services," Outlook 2000 SR-I (9.0.0.4527) Help File, on or before Aug. 10, 2001, p. 1.

"Active Directory Features," [online], Jun. 15, 1999 [retrieved on May 13, 2003]. Retrieved from the Internet http://www.microsoft.corn/windows2000/server/evaluation/features/adlist.asp, pp. 1-4.

"Active Directory Service Overview," [online], Nov. 30, 2001 [retrieved on May 13, 2003]. Retrieved from the Internet <http://www.microsoft.com/windows2000/server/evaluation/business/ad-datasheet.asp>, pp. 1-5.

"Active Directory," [online], [retrieved on May 13, 2003]. Retrieved from the Internet http://www.microsoft.com/windows2000/technologies/directory/AD/default.asp, pp. 1-13.

"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.

"AOL Instant Messenger", reprinted from http://web.archive.org/web/20010721193059/http://aim.com/ (Way Back Machine—Available on Jul. 21, 2001) on Aug. 26, 2005, 7 pages.

"AOL Instant Messenger All New Version 2.0 Quick Tips for Getting Started," Jun. 24, 1999, 5 pages.

"AOL technology: turning complicated things into engaging services," 1996 Annual Report, 22 pages.

"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.

"BestCalls.com Announces the BestCalls Technology Index," Business Wire, Jun. 30, 1999, Business Wire, (2 pages).

"Business at Cyberspeed; Brainstorm Becomes Quick Internet Hit," Walker, Jan. 24, 1999, The Washington Post, p. A.OI, (4 pages).

"CrushParty.com: Help," retrieved Jun. 12, 2002 from the World Wide Web: http://www.crushparty.comlhelp.jsp. (3 pages).

"Degrees of Separation Email Spam Protection", http://www.halfbakery.com, pp. 1-3, Dec. 2001.

"Digital Artifacts for Remembering and Storytelling: Post History and Social Network Fragments," Viegas et al., retrieved from the World Wide Web: http://we.media.mit.edul-fviegas/papers/posthistory_snf.pdf, (10 pages) 2004.

"Directory Integration Can Lower Total Cost of Ownership and Increase Application Functionality," [online], Jul. 27, 1998, [retrieved on May 13, 2003]. Retrieved from the Internet http://www.microsoft.com/presspas/press/1998/July98/ActivDPR.asp, pp. 1-4.

"Enterprise Identity Management with Windows 2000 and Active Directory," [online], 1999 [retrieved on May 13, 2003]. Retrieved from the Internet http://www.microsoft.com/technet/prodtechnol/ad/windows2000/evaluate/w2keims.asp?fra . . . ,pp. 1-16.

(56) References Cited

OTHER PUBLICATIONS

"File Transfer Preferences", AOL Instant Messenger, version 5.1, Help Documentation, apparently available as of Nov. 21, 2002, 2 pages.
"Finding Others Online: Reputation Systems for Social Online Spaces," Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive.org/web/20010418153714//http://www.gordano.com, 2 pages.
"Frequently Asked Questions About AOL Instant Messenger," Jun. 24, 1999, 6 pages.
"Hottie or Nottie? Web Site Voters Let You Know Whether You Sizzle or Fizzle," Marino, Jul. 11, 2001, Florida Times Union, p. c.i., (2 pages).
"Icq.anywhere, Email Features-Email Center-ICQ.com," retrieved Apr. 29, 2004 from the World Wide Web: http://www.icq.cornlemail/popular-features.htrnl, pp. 1-5.
"Idea for Online Networking Brings Two Entrepreneurs Together," Patents: Idea for Online Networking Brings Two EntrepreneursTogether, reprinted from http://www.nytimes.com/2003/12101/technology/Olpatt.htrnl?adxnnl+0&adxnnlx=107029 . . . , printed on Nov. 5, 2004, (2 pages).
"Instant Messaging for Gamers," PC Gamer, May 2004, vol. 11, No. 5, (2 pages).
"Integrating Applications with Windows 2000 and Active Directory,"[online], Oct. 2000 [retrieved on May 8, 2003]. Retrieved from the Internet <http:/www.microsoft.com/technet/prodtechnol/ad/windows2000/evaluate/adappstr.asp?fra . . . >, pp. 1-12.
"Integrating Microsoft Metadirectory Services and Active Directory," [online], Aug. 31, 2000 [retrieved on May 13, 2003]. Retrieved from the Internet <http://www.microsoft.com/windows2000/server/evaluation/news/bulletins/mmsma.asp>, p. 1.
"Look up contact information from an item," Outlook 2000 SR-I (9.0.04527) Help File, on or before Aug. 10, 2001, p. 1.
"Lotus Instant Messaging Everyplace FAQ" retrieved Apr. 29, 2004 from the World Wide Web: http://www.lotus.comlproducts/product4.nsf/wdocs/249c6f083166cd3e85256d7300714407, pp. 1-3.
"New Features in AOL Instant Messenger for Windows v. 2.01 Beta," Apr. 28, 1999, 2 pages.
"Part II: Tasks and Procedures," Active Directory Operations Guide, Microsoft Corporation, Microsoft Windows 2000, Version 1.5, Published Dec. 5, 2002, pp. 1-131.
"PieSpy—Inferring and Visualizing Social Network on IRC," PieSpy Social Network Bot, reprinted from http://lister.linux-srv.anlx.net/piespy printed on Mar. 11, 2004 (18 pages).
"Plaxo," Plaxo, reprinted from http://web.archive.org/web/20041105072256/http://www.plaxo.comlprinted on Nov. 5, 2004 (available on Feb. 14, 2004), (2 pages).
"Plaxo-Update Your Address Book," Plaxo Contact Networks, reprinted from http://web.archive.org/web/2003021823363 8/http://www.plaxo.comlprinted on Nov. 5, 2004 (available on Feb. 18, 2003), ( 1 page).
"Reflections on Friendster, Trust and Intimacy." Danah Boyd. *Ubicomp* 2003, Workshop Application for the Intimate Ubiquitous Computing Workshop. Seattle, WA, Oct. 12-15, 2003.
"Reputation Systems," Resnicket al., Dec. 2000, Communications of the ACM, vol. 43, No. 12, pp. 45-48.
"RIM Road: Software: Internet & Network: Webmessenger RIMJ2ME/Instant Messaging," retrieved Apr. 29, 2004 from the World Wide Web: http://www.rinnod.comisoftware/rimllWebmessenger-RIM-J2ME Instant_-Messaging-20 . . . , (4 pages).
"Set up LDAP directory services," Outlook 2000 SR-I (9.0.04527) Help File, on or before Aug. 10, 2001, p. 1.
"Six Degrees-New Programs Help Companies 'Mine Workers' Relationships for Key Business.Prospects," William M. Bulkeley et al., Marketplace, The Wall Street Journal, Aug. 4, 2003, (3 pages).
"Social Network Fragments: An Interactive Tool for Exploring Digital Social Connections." Danah Boyd, Jeff Potter. Sketch as SIGGRAPH 2003. San Diego, California: ACM, Jul. 27-31, 2003.
"Social Networking for Business: Release 0.5," Esther Dyson. Esther Dyson's Monthly Report, Release 1.0, vol. 21, No. 10, Nov. 25, 2003, www.edventure.com (36 pages).
"Social Sites Clicking With Investors," Washingtonpost.com: Social Sites Clicking With Investors, reprinted from http://www.washingtonpost.com/ac2/wp-dyn/A32066-2003NovI2?language=printer printed on Nov. 5, 2004, (2 pages).
"Social Social Networks: Deodorant for the Soul?" Esther Dyson. *Esther Dyson's Monthly Report,* Release 1.0, vol. 21, No. 11, Dec. 12, 2003, www.edventure.com (36 pages).
"Socialware: Multiagent Systems for Supporting Network Communities," Hattori et al., Mar. 1999, Association for Computing Machinery, Communications of the ACM, vol. 42, Issue 3, pp. 55ff., (6 pages).
"Spoke Builds on Social Networking Patent Portfolio," reprinted from http://www.internetnews.com/ent-news/print.php/3073621 printed on Nov. 5, 2004 (3 pages).
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technology Journal: Changing Chat-Instant Messaging is Taking Off, and For Some Users Its Nuzzling Out the Phone," Nick Wingfield, Asian WSJ, Sep. 2000, (5 pages).
"Technology Journal-Are You Satisfied? EBay's Battle Against Fraud Rests Primarily on a Simple Concept: Customer Feedback," Wingfield, Sep. 23, 2002, Asian Wall Street Journal, p. T.8, (4 pages).
"The first Social Software . . . a true Social Adventure," Huminity Social Networking, Chat Software, Create Personal Free Blogs and My Group . . . , reprinted from http://www.huminity.com/ printed on Nov. 5, 2004 (2 pages).
"The Gordano Messaging Server," http://www.gordano.com, Copyright 1994-2003, Gordano, 3 pages.
"Introducing the Gordano Messaging Suite"; http://www.gordano.com; copyright 1994-2003, 2 pages.
"The LP Wireless Messenger," Messenger Documentation, [online] LP Wireless, Inc., 2002, retrieved on Nov. 2, 2002 from http://www.lpwireless.com/messengerhelp.htm, pp. 1-7.
"Trillian Discussion Forums-HOWTO: Import ICQ 2003a Contact List," retrieved Apr. 29, 2004 from the World Wide Web: http://trillian.cc/forums/showthread.php?s+&threadid=36475, (2 pages).
"Using Active Directory Service," from Chapter 5, Microsoft Windows 2000 Administrator's Pocket Consultant, by William R. Stank (1999). pp. 1-6.
"Welcome to Huminity World of Connections," Huminity-Home, reprinted from http://web.archive.org/web/2003022S131435/www.huminity.comldefault.php?internationa . . . printed on Nov. 5, 2004 (available on Feb. 2, 2003), (1 page).
"What is AOL Instant Messenger," Jun. 24, 1999, 3 pages.
"What's new about exchanging information over the Internet," Outlook 2000 SR-I (9.0.0.4527), 1 page,on or before Aug. 10, 2001.
"Windows 2000 Directory Services," [online] http://www.microsoft.com/windows2000/technologies/directory/default.asp, Nov. 25, 2001, 1 page.
"Windows NetMeeting—Features", [Online], Jun. 17, 1999, X002245623, Retrieved from the Internet: URL:http://www.microsoft.com/windows/NetMeeting/Features/default.ASP>, 8 pages.
"YAHOO! Messenger Makes the World a Little Smaller, More Informed," Jun. 21, 1999, pp. 1-2.
A. Kolcz and J. Alspector, "SVM-based Filtering of E-mail Spam with Content-specific Misclassification Costs," *TextDM'2001* (*IEEE ICDM-2001 Workshop on Text Mining*), San Jose, CA, 2001, pp. 1-14.
Alan Cohen, "Instant Messaging," PC Magazine, PC Labs, Apr. 13, 1999, 2 pages.
America Online Inc., "AOL Instant Messenger", Aug. 29, 2000, Internet: www.aol.com/aim/, (18 pages).
America Online Inc., New AIM 4.7, Sep. 27, 2001, Internet: http://aim.aol.com, (7 pages).
Anand Ranganathan et al., "ConChat: A Context-Aware Chat Program", Jul.- Sep. 2002, Pervasive Computing, pp. 51-57.

(56) References Cited

OTHER PUBLICATIONS

Anonymous: "Push To Talk Services", Internet Document, [Online], p. 1, Retrieved from the internet: URL:http://www.nextel.com/services/directconnect/ptt_overview.shtml, 1 page.
Anonymous: "The Internet—the Advent of New Forms of Communication", Internet Document, [Online], pp. 1-4, Retrieved from the internet URL:http://www.journal.fujitsu.com/248e/e48now.htm, 3 pages.
Archive.org Archived copy of the Morpheus 1.9.1 download page on c-net Download.com [online] Jun. 20, 2002, Retrieved from the internet, URL:http://web.archive.org/web/20020803071751/download.com.com/3000-2166-10057840.html>, 2 pages.
Australian Office Action of Apr. 7, 2006, App. No. 2002340039 (2 pages).
BuddyGopher We Love Away Messages!, "BuddyGopher simultaneously checks the away messages of your favorite AIM® buddies.", available on Sep. 24, 2004, reprinted from http://web.archive.org/web/200400924104001/http://www.buddygopher.com/ on Sep. 28, 2005 (2 pgs).
BuddyGopher~About, available on Jul. 13, 2004, reprinted from http://web.archive.org/web/20040713002836/www.buddygopher.com/about.html on Sep. 28, 2005 (3 pgs).
Canadian Office Action from Application Serial No. 2403520 dated Feb. 21, 2005, 2 pages.
Chinese Office Action of Jul. 7, 2006, App. No. 02821420X (5 pages).
AOL Instant Messenger, available on Nov. 21, 2002, reprinted from http://web.archive.org/web/20021121031257/http:// aim.com on Aug. 31, 2005 (2 pages).
Bart Massey et al.; "Learning Spam: Simple Techniques for Freely Available Software", Computer Science Dept., Portland, OR USA, 2003, pp. 1-14.
CNET Networks Inc., "PopUp Killer", Sep. 13, 2001, Internet: download.cnet.comidownloads/0-10059-100-6932612.html, (3 pages).
Courter et al., "Mastering Microsoft Outlook 2000 Premium Edition", Sybex Inc., Alameda, California, Feb. 2000, pp. 167-169, ISBN 0-7821-2676-6.
Dodgeball.com:: mobile social software, "help: text messaging", available on Oct. 13, 2004, reprinted from http://web.archive.org/web/20041013034241/www.dodgeball.com/social/help-text.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/help—basics.php on Sep. 28, 2005 (2 pgs).
Dodgeball.com:: mobile social software, "help: use it", available on Oct. 9, 2004, reprinted from http://web.archive.org/web/20041009201853/www.dodgeball.com/social/help—useit.php on.Sep. 28, 2005 (2 pgs).
Dodgeball.com:: mobile social software, "Hook up with friends. Discover what's around you", available on Nov. 30, 2003, reprinted from http://web.archive.org/web/20041130034344/www.dodgeball.com/social/index.php on Sep. 28, 2005 (2 pgs).
Dutta-Roy Amitava, "Virtual Meetings with Desktop Conferencing", IEEE Spectrum, vol. 35, No. 7, Jul. 1, 1998, pp. 47-56 and p. 66.
Ed Bott and Ron Person, Using Windows 95 with Internet Explorer 4.0, Feb. 17, 1995, Que, Special Edition, (21 pages).
Eschenburg, WO laufen sie denn?, Oct. 26, 1998, pp. 92-95.
H. Drucker et al., "Support Vector Machines for Spam Categorization", IEEE Transactions on Neural Networks, vol. 10, No. 5, Sep. 1999, pp. 1048-1054.
Home-tribe.net, http://washingtondc.tribe.net/message/24434d1b817b-4580-aa42-3bffal5f26a?page=1, (4 pages) available at least as early as Dec 13, 2004.
http://www.friendster.com, Dec. 2004, ( 17 pages).
Hudson, Greg; Security in the Internet Message and Presence Protocols, http://mirrors.isc.org/pub/www.watersprings.org/pub/id/ draft-hudson-impp-security-00.txt; p. 6, section 7.2.2, first paragraph, p. 6 section 7.2.1, lines 1-2, Nov. 21, 2000.
IBM "Configuring Sametime servers in your Domino environment" May 1, 2000 (14 pages).
Ion Adroutsopoulos et al., "Learning to Filter Spam E-Mail: A Comparison of a Naive Bayesian and a Memory-Based Approach", University of Athens, Sep. 2000, pp. 1-12.
Isaacs, Ellen: "Example UI Spec: Sound Internet Messages", Internet Document, [online], pp. 1-2. Retrieved from the internet: URL:http://www.uidesigns.com/spec/d-sims.html [retrieved on Jun. 26, 2003].
J. Dudley, "Telstra targets Net spammers", news.com.au, Dec. 2, 2003, 2 pages.
J.C. Cannon, "Design Guide for Directory-Enabled Applications,"[online], Apr. 2001 [retrieved on May 13, 2003]. Retrieved from the Internet <http://msdn.microsoft.com/library/en-us/dnactdir/html/ deal.asp?frame=true>, pp. 1-18.
Japanese Office Action of May 12, 2008, App. No. 2003-533140 (7 pages).
Joanna Glasner, "Social Nets Find Friends in VCs", http://www.wired.com/news, Nov. 17, 2003, pp. 1-3.
Klaus Hartenstein et al., "xhtalk 2.9", Nov. 1992, 6 pages.
Kohda et al., "IMPP: A New Instant Messaging Standard and Its Impact on Internet Business," Dec. 2000, Fujitsu Sci. Tech. J., 36, 2, pp. 147-153.
Leander Kahney, "Will You Buy a Car From This Man?", Oct. 6, 2003, pp. 1-3.
Lotus Sametime 1.5 Jul. 27, 1999 (4 pages).
Mariano, Gwendolyn. ZDNetNews, "Morpheus 1.9 to be unleashed", [online] Jun. 10, 2002. Retrieved from internet URL: http;//news.zdnetcom/2100-3513_22-934615.htm, 6 pages.
Mary Beth Marklein, "Student have 'away' with words", Mar. 28, 2004, USA RODAY, http://www.usatoday.com/tech/news/2004-03-28-aways-messages-usat-x.htm, all pages.
Matsumoto, Tatsuro et al.: "Chocoa Communicator—A New Communication System based on Awareness and Text Communications—", FUJITSU Sci. Tech. J., 36, 2, pp. 154-161, Dec. 2000.
M. Hearst et al., "Support Vector Machines", IEEE Intelligent Systems, Jul./ Aug. 1998, pp. 18-28.
M. Marvin, "Announce: Implementation of E-mail Spam Proposal", news.admin.net-abuse.misc, Aug. 3, 1996, 2 pages.
McKendrick, Joseph, "Internet Call Centers: New Era in Customer Service," Feb. 2002, vol. 10, n2, 5 pages.
Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdn_adsiexch.asp?frame=-true>, pp. 1-12.
Microsoft Corporation, "Comparing Microsoft Active Directory to Novell's NDS," [online], Sep. 1998 [retrieved on May 13, 2003]. Retrieved from the Internet.<http://msdn.microsoft.com/library/enus/dnactdir/html/msdn_activedirvsnds.asp?frame=true>, pp. 1-17.
Microsoft Corporation, "Introduction to Active Directory Application Mode," Microsoft Windows Server 2003, Aug. 2002, pp. 1-13.
Microsoft Corporation, "Using ADSI, LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?framc-truc>, pp. 1-9.
Mike Snider, "America goes online for New Year's bash", USA Today, Jan. 3, 2000, 1 page.
Muller, Nathan, "Dial 1-800-Internet": Feb. 1996, pp. 83-84, 86, 88.
Neo Mai, Ken Neo. "Buying and selling on the internet; [Computimes, 2* Edition]." New Straits Times. Kuala Lumpur: Jun. 28, 2001. p. 53.
Part I: Active Directory Operations, Active Directory Operations Guide, Microsoft Corporation, Microsoft Windows 2000, Version 1.5, Published Dec. 5, 2002, pp. 1-187.
Paul Graham, "Better Bayesian Filtering", Jan. 2003, pp. 1-11, http://www.paulgraham.com/better.html.
Paul Mutton, "PieSpy Social Network Bot-Inferring and Visualizing Social Networks on IRC", jibble.org, http://lister.linux-srv.anlx.net/piespy, © 2001-2004, pp. 1-18.

(56) References Cited

OTHER PUBLICATIONS

PowWow (Mar. 1, 2000), Introduction, Retrieved Apr. 3, 2006 from website http://Web.archive.org/web/20000301125635/ww2.tribal.com/help/online_docs/h205voic.html.
Pruitt, Scarlet. IDG News Service. "Morpheus Updates Peer-to-Peer Client" [online] Jun. 10, 2002, Retrieved from the internet URL:http://www.pcworld.com/article/id.101736/article.html, 3 pages.
R. Hall, "A Countermeasure to Duplicate-detecting Anti-spam Techniques", AT&T Labs Technical Report 99.9.1, 1999, Abst. and pp. 1-26.
R. Movva & W. Lai, "MSN Messenger Service 1.0 Protocol," Aug. 1999, Internet Draft, http://tools.ietf.org/id!draft-movva-msn-messenger-protocol-oo.txt, 28 pages.
Reichard, K., "AOL, ICQ to Interoperate-But in a Limited Fashion," Oct. 30, 2002, InstantMessagingPlanet, available at www.instantmessagingplanet.com/public/articie.php/1490771.
Ryze home page, www.ryze.com, Dec. 21, 2003, available at http://web.archive.org/web/20031221010006/http://ryze.com, printed Mar. 16, 2005, (13 pages).
S. Hird, "Technical Solutions for Controlling Spam", Proceedings of AUUG2002, Melbourne, Sep. 4-6, 2002, 17 pages.
Satter, Michael, excerpts from the Internet TV with CU-SeeMe, First Edition, including inside Title Page and Copyright Page; "Overview"; "Contents,"through pages xii; Chapter 1, "Introduction to the Internet Videoconferencing and CU-SeeMe," pp. 1-12; Chapter 4, "Hardware,"pp. 47-64; Chapter 5, "Software," pp. 65-92: Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, In 46290, International Standard Book Number: 1-57521-006-1, Library of Congress Catalog Card Number: 95-70178, copyright 1995.
Stanek, William R., "Working with Active Directory Domains," from Chapter 5, Microsoft Windows 2000 Administrator's Pocket Consultant, (1999). pp. 1-10.
T. Joachims, "Text Categorization with Support Vector Machines: Learning with Many Relevant Features", University of Dortmund, Computer Science Dept., LS-8 Report 23, 1998, 18 pages.
Takashi Yoshino et al., "Namba: Location-Aware Collaboration System for Shopping and Meeting", Aug. 2002, IEEE Transactions on Consumer Electronics, pp. 470-477.
Tribal Voice, PowWow Guided Tour—Step 6, PowWow personal communication. Http://web.archive.org/web/2000817094516/www.tribal.com/powwow/tour/step6.cfm (Oct. 22, 1999), 2 pages.
VisiblePath webpages, www.visiblepath.org, Dec. 3, 2003, available at http://web.archive.org/web/200312031322111http://www.visiblepath.com, printed Mar. 16, 2005, (5 pages).
Wayner, Peter, "Hey Baby, Call Me at My IP Address", Apr. 1996, 3 pages.
WBWE (1998), PowWow 3.6 Brings the Power of Internet Community to the People, Business.Wire, 2 pages.
WebmasterWorld.com Inc., "HTML and Browsers", Mar. 5, 2001, Internet: www.webmaster.com/forum21/367.htm, (2 pages).
Yubing Wang, Mark Claypool, Zheng Zuo. Video: An empirical study of realvideo performance across the internet. Proceedings of the 1st ACM SIGCOMM Workshop on the internet measurement IMW'01. Nov. 2001. ACM Press. 15 pages.
ZeroDegrees home page, www.zerodegrees.com, Jan. 24, 2004, available at http://web.archive.org/web/20040204153037/www.zerodegrees.com/home.htm, printed Mar. 16, 2005, (2 page).
International Search Report for International Application No. PCT/US03/15715, mailed Aug. 14, 2003, 6 pages.
International Search Report from International Application No. PCT/US03/41499, dated Oct. 27, 2004.
International Search Report and Written Opinion dated Feb. 15, 2006 for International Application No. PCT/US05/07204, (10 pages).
International Search Report and Written Opinion issued for PCT Application No. PCT/US2005/042992, Mar. 6, 2007 914 pages).
International Search Report and Written Opinion issued in International Application No. PCT/US05/45663, dated Apr. 11, 2008.
International Search Report issued in Application Serial No. PCT/US05/08476, dated Oct. 16, 2006, (9 pages).
International Search Report issued in International Application No. EP03731244, dated Aug. 30, 2005, (4 pages).
International Search Report of Apr. 11, 2003, App. No. PCT/US00/35160 (3 pages).
International Search Report of Jan. 9, 2003, App. No. PCT/US02/30730 (4 pages).
International Search Report, Application Serial No. PCT/US2006/018286, dated Oct. 19, 2006, 12 pages.
Supplementary European Search Report issued in European Application No. 05857099.5-1238/1836596 PCT/US2005045663, dated Nov. 7, 2008, (5 pages).
Supplementary European Search Report issued in European Application No. EP 05728303, dated Jan. 9, 2009, (4 pages).
European Office Action in Application No. 01954931.0-2414, mailed Jul. 14, 2008, 3 pages.
European Patent Office, Communication of Aug. 30, 2005, App. No. 03731244.1-2416 (PCT/US0315715) 4 pages.
European Patent Office, Communication of Aug. 31, 2009, App. No. 02778374.5-1238, 8 pages.
European Patent Office, Communication of Sep. 5, 2006, App. No. 02778374.5-1238, 4 pages.
Office Action mailed approximately Feb. 29, 2006 for Japanese Patent Application No. 2002-515026 (6 pages).
Office Action of Canadian Application No. 2,462,037, dated Feb. 12, 2009, 8 pages.
U.S. Appl. No. 09/810,159, filed Jul. 6, 2004, Office Action.
U.S. Appl. No. 09/810,159, filed Feb. 11, 2005, Office Action.
U.S. Appl. No. 09/810,159, filed Jun. 15, 2005, Office Action.
U.S. Appl. No. 09/810,159, filed Dec. 2, 2005, Office Action.
U.S. Appl. No. 09/810,159, filed Apr. 19, 2006, Office Action.
U.S. Appl. No. 09/810,159, filed Jan. 10, 2008, Examiner's Answer.
U.S. Appl. No. 09/810,159, filed Jan. 11, 2008, Office Action.
U.S. Appl. No. 09/810,159, filed Jan. 29, 2010, Office Action.
U.S. Appl. No. 09/843,788, filed Mar. 30, 2004, Office Action.
U.S. Appl. No. 09/843,788, filed Dec. 2, 2004, Office Action.
U.S. Appl. No. 09/843,788, filed Jul. 27, 2005, Office Action.
U.S. Appl. No. 09/843,788, filed Mar. 28, 2006, Office Action.
U.S. Appl. No. 09/843,788, filed Jun. 12, 2006, Office Action.
U.S. Appl. No. 09/843,788, filed Apr. 19, 2007, Office Action.
U.S. Appl. No. 09/843,788, filed Oct. 31, 2007, Office Action.
U.S. Appl. No. 09/843,788, filed Sep. 15, 2008, Office Action.
U.S. Appl. No. 09/843,788, filed May 5, 2010, Office Action.
U.S. Appl. No. 09/911,799, filed Oct. 5, 2004, Office Action.
U.S. Appl. No. 09/911,799, filed Apr. 29, 2005, Office Action.
U.S. Appl. No. 09/911,799, filed Nov. 17, 2005, Office Action.
U.S. Appl. No. 09/911,799, filed Aug. 11, 2006, Office Action.
U.S. Appl. No. 09/911,799, filed Jul. 3, 2007, Office Action.
U.S. Appl. No. 09/911,799, filed Dec. 1, 2008, Office Action.
U.S. Appl. No. 09/911,799, filed Mar. 18, 2009, Office Action.
U.S. Appl. No. 09/911,799, filed Mar. 18, 2010, Office Action.
U.S. Appl. No. 10/134,437, filed Nov. 1, 2005, Office Action.
U.S. Appl. No. 10/134,437, filed May 18, 2006, Office Action.
U.S. Appl. No. 10/134,437, filed Aug. 21, 2006, Advisory Action.
U.S. Appl. No. 10/134,437, filed Sep. 6, 2007, Miscellaneous Action.
U.S. Appl. No. 10/134,437, filed Feb. 11, 2008, Office Action.
U.S. Appl. No. 10/134,437, filed Sep. 18, 2008, Office Action.
U.S. Appl. No. 10/134,437, filed Mar. 10, 2009, Office Action.
U.S. Appl. No. 10/134,437, filed Oct. 2, 2009, Notice of Allowance.
U.S. Appl. No. 10/134,437, filed Nov. 17, 2009, Supplemental Notice of Allowability.
U.S. Appl. No. 10/146,814, filed May 17, 2002, Examiner's Answer.
U.S. Appl. No. 10/146,814, filed Sep. 20, 2005, Office Action.
U.S. Appl. No. 10/146,814, filed May 22, 2006, Office Action.
U.S. Appl. No. 10/146,814, filed Dec. 11, 2006, Office Action.
U.S. Appl. No. 10/146,814, filed Jul. 2, 2007, Office Action.
U.S. Appl. No. 10/146,814, filed Apr. 15, 2008, Office Action.
U.S. Appl. No. 10/146,814, filed Jan. 12, 2009, Office Action.
U.S. Appl. No. 10/146,814, filed Mar. 22, 2010, Office Action.
U.S. Appl. No. 10/184,002, filed Aug. 25, 2005, Office Action.

(56) References Cited

OTHER PUBLICATIONS

U.S. Appl. No. 10/184,002, filed Apr. 20, 2006, Office Action.
U.S. Appl. No. 10/184,002, filed Jan. 9, 2007, Office Action.
U.S. Appl. No. 10/184,002, filed Jan. 8, 2008, Office Action.
U.S. Appl. No. 10/184,002, filed Jul. 24, 2008, Office Action.
U.S. Appl. No. 10/334,056, filed Nov. 29, 2004, Office Action.
U.S. Appl. No. 10/334,056, filed Jul. 6, 2005, Office Action.
U.S. Appl. No. 10/334,056, filed Oct. 31, 2005, Office Action.
U.S. Appl. No. 10/334,056, filed May 10, 2006, Office Action.
U.S. Appl. No. 10/334,056, filed May 21, 2007, Office Action.
U.S. Appl. No. 10/334,056, filed Nov. 5, 2007, Office Action.
U.S. Appl. No. 10/334,056, filed May 12, 2008, Office Action.
U.S. Appl. No. 10/334,056, filed Oct. 30, 2008, Office Action.
U.S. Appl. No. 10/633,636, filed Oct. 11, 2006, Office Action.
U.S. Appl. No. 10/746,230, filed Mar. 17, 2009, Office Action.
U.S. Appl. No. 10/746,230, filed Oct. 5, 2009, Office Action.
U.S. Appl. No. 10/746,230, filed Apr. 9, 2010, Notice of Allowance.
U.S. Appl. No. 10/746,230, filed Jan. 6, 2011, Notice of Allowance.
U.S. Appl. No. 10/746,232, filed Mar. 18, 2009, Office Action.
U.S. Appl. No. 10/746,232, filed Oct. 30, 2009, Office Action.
U.S. Appl. No. 10/746,232, filed Jun. 10, 2010, Notice of Allowance.
U.S. Appl. No. 10/746,232, filed Jan. 18, 2011, Notice of Allowance.
U.S. Appl. No. 10/747,623, filed Mar. 13, 2007, Office Action.
U.S. Appl. No. 10/747,623, filed Aug. 21, 2007, Office Action.
U.S. Appl. No. 10/747,623, filed Nov. 14, 2007, Office Action.
U.S. Appl. No. 10/747,623, filed Aug. 23, 2008, Office Action.
U.S. Appl. No. 10/747,624, filed Feb. 26, 2007, Office Action.
U.S. Appl. No. 10/747,624, filed Jul. 16, 2007, Office Action.
U.S. Appl. No. 10/747,624, filed Nov. 1, 2007, Office Action.
U.S. Appl. No. 10/747,679, filed Oct. 2, 2007, Office Action.
U.S. Appl. No. 10/747,679, filed Apr. 29, 2008, Office Action.
U.S. Appl. No. 10/981,460, filed Aug. 20, 2008, Office Action.
U.S. Appl. No. 11/015,423, filed Mar. 2, 2009, Office Action.
U.S. Appl. No. 11/015,424, filed Mar. 19, 2008, Office Action.
U.S. Appl. No. 11/015,424, filed Nov. 3, 2008, Office Action.
U.S. Appl. No. 11/015,424, filed May 1, 2009, Office Action.
U.S. Appl. No. 11/015,424, filed Oct. 19, 2009, Office Action.
U.S. Appl. No. 11/015,424, filed Feb. 17, 2010, Notice of Allowance.
U.S. Appl. No. 11/015,476, filed Mar. 2, 2009, Office Action.
U.S. Appl. No. 11/017,204, filed Dec. 12, 2007, Office Action.
U.S. Appl. No. 11/017,204, filed Jun. 23, 2008, Office Action.
U.S. Appl. No. 11/079,522, filed Apr. 3, 2009, Office Action.
U.S. Appl. No. 11/079,522, filed Oct. 16, 2008, Office Action.
U.S. Appl. No. 11/150,180, filed Oct. 2, 2007, Office Action.
U.S. Appl. No. 11/150,180, filed Apr. 7, 2008, Office Action.
U.S. Appl. No. 11/150,180, filed Aug. 19, 2009, Office Action.
U.S. Appl. No. 11/237,718, filed Apr. 2, 2009, Office Action.
U.S. Appl. No. 11/237,718, filed Oct. 30, 2009, Office Action.
U.S. Appl. No. 11/237,718, filed Apr. 2, 2010, Notice of Allowance.
U.S. Appl. No. 11/238,110, filed Nov. 19, 2007, Office Action.
U.S. Appl. No. 11/238,110, filed Jul. 9, 2008, Office Action.
U.S. Appl. No. 11/238,110, filed Oct. 9, 2008, Office Action.
U.S. Appl. No. 11/238,129, filed Nov. 14, 2007, Office Action.
U.S. Appl. No. 11/238,129, filed May 28, 2008, Office Action.
U.S. Appl. No. 11/238,130, filed Apr. 14, 2009, Office Action.
U.S. Appl. No. 11/238,130, filed Nov. 13, 2008, Office Action.
U.S. Appl. No. 11/238,130, filed Jul. 3, 2008, Office Action.
U.S. Appl. No. 11/238,130, filed Nov. 24, 2009, Office Action.
U.S. Appl. No. 11/464,816, filed Apr. 21, 2009, Office Action.
U.S. Appl. No. 11/782,461, filed Jan. 22, 2008, Office Action.
U.S. Appl. No. 11/782,461, filed Jul. 17, 2008, Office Action.
U.S. Appl. No. 11/782,461, filed Oct. 7, 2008, Notice of Allowance.
U.S. Appl. No. 12/336,880, filed Aug. 4, 2010, Office Action.
U.S. Appl. No. 12/349,161, filed Jun. 4, 2010, Office Action.
U.S. Appl. No. 12/349,161, filed Oct. 1, 2010, Office Action.
U.S. Appl. No. 12/349,161, filed Jan. 24, 2011, Notice of Allowance.
U.S. Appl. No. 12/765,045, filed Dec. 12, 2011, Office Action.
U.S. Appl. No. 12/765,045, filed Jul. 19, 2012, Office Action.
U.S. Appl. No. 12/765,045, filed Dec. 31, 2012, Office Action.
U.S. Appl. No. 12/765,045, filed Apr. 15, 2013, Office Action.
U.S. Appl. No. 12/765,045, filed Mar. 7, 2014, Office Action.
U.S. Appl. No. 12/852,769, filed Nov. 14, 2012, Office Action.
U.S. Appl. No. 12/852,769, filed Jul. 13, 2013, Office Action.
U.S. Appl. No. 12/852,769, filed Sep. 20, 2013, Notice of Allowance.
U.S. Appl. No. 13/093,147, filed Jul. 19, 2011, Office Action.
U.S. Appl. No. 13/093,147, filed Jan. 27, 2012, Notice of Allowance.
U.S. Appl. No. 10/334,142, filed Sep. 7, 2004, Office Action.
U.S. Appl. No. 10/334,142, filed May 4, 2005, Office Action.
U.S. Appl. No. 10/334,142, filed Dec. 6, 2005, Office Action.
U.S. Appl. No. 10/334,142, filed Jul. 14, 2006, Office Action.
U.S. Appl. No. 10/334,142, filed Dec. 29, 2006, Office Action.
U.S. Appl. No. 10/334,142, filed Apr. 18, 2007, Notice of Allowance.
U.S. Appl. No. 13/472,583, filed Dec. 6, 2012, Office Action.
U.S. Appl. No. 13/472,583, filed Jul. 1, 2013, Notice of Allowance.
U.S. Appl. No. 13/620,921, filed Feb. 15, 2013, Office Action.
U.S. Appl. No. 13/620,921, filed Aug. 7, 2013, Office Action.
U.S. Appl. No. 13/620,921, filed Dec. 20, 2013, Office Action.
U.S. Appl. No. 13/620,921, filed Apr. 25, 2014, Notice of Allowance.
U.S. Appl. No. 14/049,069, filed May 23, 2014, Office Action.

* cited by examiner

IMPLICIT POPULATION OF ACCESS CONTROL LISTS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation application of and claims priority to U.S. application Ser. No. 11/782,461, now U.S. Pat. No. 7,490,238, filed Jul. 24, 2007, which is a continuation of U.S. application Ser. No. 10/334,142, now U.S. Pat. No. 7,263,614, filed on Dec. 31, 2002, the entire contents all of which are hereby incorporated by reference.

TECHNICAL FIELD

The following description relates to network communications.

BACKGROUND

With the rapid proliferation and affordability of computers, the Internet has become the communications medium of choice for many users. Although the Internet is a public medium, techniques have been developed for using the Internet to enable private communications between networks. One such private communications technique is used to enable instant messaging.

Instant messaging allows users to rapidly communicate with other users of a communications network. Generally, client messaging software runs on a client A device 102 and provides a communications interface for entry of a message. The intended message recipient may be entered manually or may be selected from a user list, such as a Buddy List™ from America Online, Inc. Instant messaging may be used to communicate text messages, images, and sounds or voice.

SUMMARY

In one general aspect, messaging applications, systems, and methods may be used to automatically configure a communications pathway based on an implicit trust between users. Each user of a communications application may have a user list that identifies other users to which a message may be sent. If two users of the communications application each include the other user on their user lists, an implicit trust may be inferred between the users. For example, if user A includes user B in her user list and user B includes user A in his. user list, then it may be inferred or determined that each user knows and/or implicitly trusts the other user. As a result, a connection or communications pathway may be automatically created and/or configured between the client devices of the users to facilitate communications between the users based on the implicit trust.

The communications application may be an instant messaging application. The communications pathway may be implemented as a virtual private network.

In another general aspect, a communications pathway between a first client A device 102 associated with the first user and a second client A device 102 associated with the second user may be established upon determining that the first user is included on a user list associated with a communications application of the second user and that the second user is included on the user list associated with a communications application of the first user. The communications pathway may be a virtual private network.

To establish the communications pathway, an Internet protocol address of the first user may be provided to the second client device, and an Internet protocol address of the second user may be provided to the first client device. A shared secret also may be provided to the first and second client devices. The first client device may contact the Internet protocol address of the second client A device 102 and present the shared secret. The second client device may validate the identity of the first client B device 104 based on the presented shared secret.

In another general aspect, upon determining that an Internet protocol address (e.g., a global Internet protocol address of a firewall associated with the first client device) of a communication received from a first client device is different from the Internet protocol address (e.g., a local source Internet protocol address) of the first client device, a determination may be made that a direct communications pathway between the first client A device 102 and the second client device may not be established. In this case, to establish the communications pathway a hole may be opened in the firewall associated with the first client device for an Internet protocol address associated with the second client device.

To open the hole, a request for a proxy forward may be sent to the firewall. The firewall selects a target Internet protocol address and a port number. The target Internet protocol address is provided to a host (e.g., an instant messaging host) associated with the communications application. The host sends the target Internet protocol address to the second client device. The second client device responds to the host with an Internet protocol address associated with the second client device. The host provides the Internet protocol address associated with the second client device to the firewall associated with the first client device to enable the proxy forward for the Internet protocol address associated with the second client device.

The Internet protocol address associated with the second client device may be the Internet protocol address of a firewall associated with the second client device.

Other features will be apparent from the description, the drawings, and the claims.

DESCRIPTION OF DRAWINGS

Like reference symbols in the various drawings indicate like elements.

DETAILED DESCRIPTION

Some communications techniques include the use of a contact list or user list. Communications applications employing these techniques facilitate communications by allowing a user to select an intended recipient of a message from the user list. Although such applications provide a useful interface for transmitting messages, the user lists also may be helpful to facilitate other types of communications. For example, if two users include each other on their user lists, an implicit trust between the users may be inferred. Based on the implicit trust, a communications pathway may be established between the users to facilitate communications, as described in detail below.

Figure 1:
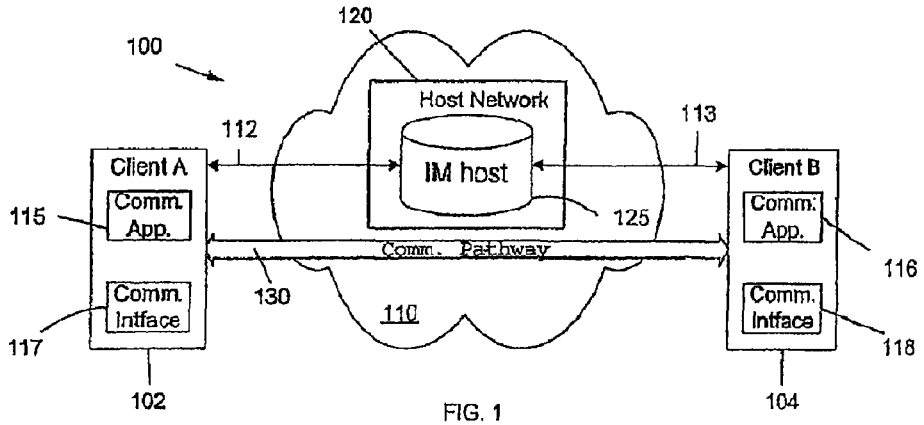
FIGS. 1-4 and 7 are block diagrams of an exemplary communications system including communications pathways.

Referring to FIG. 1, a communications system 100 includes a client A device 102 and a client B device 104 that are associated with users A and B. Client device 102 and 104 include communication applications 115 and 116 (e.g., IM applications). When client A device 102 connects to the external network 110, the communications application 115 may connect with the host network 120 connected to the external network 110 (e.g., by logging-on to the host network 120) using communications link 112. The client A device 102 also may connect to an IM host 125 that is part of the host network 120. Similarly, when client B device 104 connects to the external network 110, the communications application 116 may connect with the host network 120 and the IM host 125 using communications link 113. Once a client device 102 or 104 has connected to the IM host 120, the communications applications 115 and 116 may send and receive messages.

If user A sends a message to user B, the IM host 125 may determine that the user list of user B or a particular portion of the user list (e.g., a group, such as buddies, family, or garners) includes user A, and that the user list (or particular portion of the user list) of user A includes user B. Based on this determination, the IM host 125 may infer that there is an implicit trust between user A and user B or that user A and user B have granted access of their client devices to each other. The IM host 125 automatically creates a communications pathway between the client devices 102 and 104 by sending a message to each of client devices 102 and 104. Each message includes the IP address and port of the other client A device 102 and a shared secret.

Each client device may contact the other client device using the specified IP address and port. In addition, each client device may present the shared secret to the other client device to validate. The client devices 102 and 104 then enter negotiations to establish the details (e.g., a communications protocol and encryption) of the communications pathway 130.

The external network 110 may be implemented using one or more local area networks (LANs), wide area networks (WANs), global networks, or any combination of these networks (e.g., the World Wide Web or the Internet). These networks may include any number of components and/or devices (e.g., hubs, routers, switches, servers, repeaters, storage devices, communications interfaces, and various communications media) and various other supporting components (e.g., software, operators/administrators/technicians, and other infrastructure).

The client devices 102 and 104 may be operated by one or more users to access the external network 110 and any associated devices and/or components. An example of a client device is a general-purpose computer capable of responding to and executing instructions in a defined manner. Client devices also may include a special-purpose computer, a personal computer ("PC"), a workstation, a server, a laptop, a Web-enabled phone, a Web-enabled personal digital assistant ("PDA"), an interactive television set, a set top box, an on-board (i.e., vehicle-mounted) computer, or a combination of one or more these devices capable of responding to and executing instructions. The client device may include any number of other devices, components, and/or peripherals, such as memory/storage devices, input devices, output devices, user interfaces, and/or communications interfaces.

The client A device 102 also may include one or more software applications (e.g., an operating system, a browser application, a microbrowser application, a server application, a proxy application, a gateway application, a tunneling application, an e-mail application, an IM client application, an online service provider client application, and/or an interactive television client application) loaded on the client device to command and direct the client device. Applications include a computer program, a piece of code, an instruction, or some combination thereof, for independently or collectively instructing the client device to interact and operate as desired.

The applications may be embodied permanently or temporarily in any type of machine, device, component, physical or virtual equipment, storage medium, or propagated signal capable of providing instructions to the client device. In particular, the applications may be stored on a storage media or device (e.g., read only memory (ROM), a random access memory (RAM), a volatile/non-volatile memory, a magnetic disk, or a propagated signal or wave) readable by the client device, such that if the storage medium or device is read by the client device, the steps or instructions specified are performed.

Each of the client devices 102 and 104 also includes one or more a corresponding communications interface 117 or 118 that allow the client device to send information to and receive information from the corresponding communications links 112 or 113.

The communications links 112 and 113 may be configured to send and receive signals (e.g., electrical, electromagnetic, or optical) that convey or carry data streams representing various types of analog and/or digital content. For example, the communications links 112 and 113 may be implemented using various communications media and one or more networks comprising one or more network devices (e.g., servers, routers, switches, hubs, repeaters, and storage devices). The one or more networks may include WANs, LANs, a plain old telephone service (POTS) network, a digital subscriber line (DSL) network, an integrated services digital network (ISDN), and a synchronous optical network (SONNET), or a combination of one or more of these networks. In addition, the communications links 112 and 113 may include one or more wireless links that transmit and receive electromagnetic signals, such as, for example, radio, infrared, and microwave signals, to convey information.

Communications applications, such as communications applications 115 and 116, loaded and/or running on a client device may command and direct communications by the client device. The communications applications may work in conjunction with or enable the corresponding communications interface 117 or 118 to exchange data with other devices, networks, and communications media. Examples of communications applications include a browser application, a microbrowser application, a server application, a proxy application, a gateway application, a tunneling application, an e-mail application, an instant messaging (IM) application, an interactive television application, and/or an Internet service provider (ISP) application.

As described above, one example of a communications application is the IM application. The IM application may provide an IM user interface that allows a user to send and receive messages. The IM user interface may include an IM message display area including one or more windows/frames to enter and present messages. The IM user interface also may include icons, menus, and/or other inputs to control the interface, configure interface settings, and activate features of the interface.

One feature of an IM application is a list of users or contacts, such as, for example, the Buddy List for AOL's Instant Messenger. The user list may be populated with identifiers (e.g., screen names) of one or more users. The user identifiers that populate the user list may be divided into one or more categories of users (e.g., friends, family, coworkers, buddies, and garners).

The user list also provides an indication of whether a user associated with an identifier is currently able to receive messages (e.g., is currently connected to the external network 110 and able to engage in a one-to-one and/or peer-to-peer communication with another client device). A user may send a message to another user by manually entering a user identifier or selecting a user identifier from the list.

When the IM application is activated and the client device is connected to the external network 110, the IM application causes the client device to contact the host network 120, which is connected to the external network 110. The host network 120 may include one or more login servers (not shown) to enable communications with and to authorize access by a client A device 102 and other networks to various elements of the host network 120 and/or the IM host 125. The IM host 125 may include one or more IM servers and storage devices that manage and enable IM communications provided by the host network 120.

To access the IM host 125 and begin an IM session, the client device 102 or 104 establishes a connection to the login server. The login server determines whether a particular user is authorized to access the IM host 125 by verifying a user identifier and/or a password. If the user is authorized to access the IM host 125, the login server identifies a particular IM server (not shown) for use during the user's session. The client device establishes a connection to the IM host 125 and the designated server through the corresponding communications link 112 or 113.

Once a connection to the IM server has been established, the client device may directly or indirectly transmit data to and access content from the IM server. By accessing the IM server, a user may use the IM application to view whether or not particular users are online, exchange instant messages with users, participate in group chat rooms, trade files, such as pictures, invitations, or documents, find other users with similar interests, get customized news and stock quotes, and search the World Wide Web.

The IM host 125 also may include a user profile server (not shown) connected to a database that may store user profile data. The user profile server may be used to enter, retrieve, edit, manipulate, or otherwise process user profile data. In one implementation, a user's profile data includes, for example, a user list, identified interests, a geographic location, an Internet protocol address associated with the client device, a general account, and demographic information. The user may enter, edit and/or delete profile data using an installed IM application on the client device.

Because the user data profile may be accessed by the IM host 125, the user does not have to reenter or update such information in the event that the user accesses the IM host 125 using a new or different client device. Accordingly, when a user accesses the IM host 125, the IM server can instruct the user profile server to retrieve the user's profile data from the database and to provide, for example, the user list to the IM server. The user profile server also may communicate with other servers in the host network 120 to share user profile data. The user profile data also may be saved locally on a client device. In this implementation, the client device may provide the user profile or user profile data to the host network 120 at specified times or when requested. In another implementation, the user profile may be stored locally at the client A device 102 and at the host network 120 and may be periodically synchronized (e.g., at login).

One communications pathway 130 that may be established between the client devices is a virtual private network (VPN). A VPN, also known as an encrypted tunnel, allows two physically separated networks or client devices to be connected over a WAN, such as the Internet, without exposing transmitted data to viewing by unauthorized parties. VPNs require at least two cooperating devices. The communication path between these devices may be viewed as a secure tunnel through the insecure external network 110. Wrapped around the tunnel is a series of functions, which may include authentication, access control, and data encryption, that protect the transmitted data from being viewed or used by others. The VPN may be established by the IM application or other communication application working in conjunction with the communications interface 117 or 118 and/or other devices (e.g., a firewall).

In one implementation, a communications pathway 130 maybe established as follows. When a first user sends an instant message to second user, the IM host 125 receives the message, and, if the second user is connected to the host network 120, sends the message to the second user. In addition, the IM host may determine whether each user is listed in the user list of the other user (e.g., by contacting the profile server or by querying the client devices). If each user is listed in the user list of the other user, the IM host 125 may determine that permission has been granted implicitly by each user to give the other user access to their client device.

The IM host 125 may then send a message to each client device including the IP address and port of the other client A device 102 and a shared secret. The shared secret may include information (e.g., an identification, a key, or a certificate) that enables a client device to prove and/or authenticate the identity of a user. In another implementation, the shared secret may be provided to each client B device 104y a third party host (e.g., an Internet certificate site, such as Verisign) that facilitates communications.

Using the information in the message from the IM host 125, each client device may attempt to establish a communications pathway 130. For example, each device may contact the other client A device 102 the IP address and port specified in the message. After establishing contact with the other client device, the shared secret is presented to prove the identity of the contacting client device. Once the shared secret is verified by the other client device, the client devices may enter negotiations to establish the details of the communications pathway 130 (e.g., a communications protocol and encryption). If two communications pathways are established, one may be dropped during the negotiations.

Once the communications pathway 130 is established, the client devices may exchange data using the communications pathway 130. Both client devices are provided with, in effect, a virtual network communication card that is able to exchange information directly with the other client device. This process is transparent to the users of the client devices.

In another implementation, a client device may send a request to the IM host 125 to establish a connection with another client device. In this case, the IM host 125 responds to the request by determining whether the implicit access has been granted between the requesting client A device 102 and the target client device. If so, the requesting client device is provided with the IP address and port of the target device and a shared secret. The target device also is provided with the shared secret. Establishing of the communications pathway 130 may then proceed as described above.

Either or both client devices may attempt to establish a communications pathway 130. If both client devices attempt to establish the communications pathway 130, only one of the attempts needs to be successful. However, if more than one communications pathway 130 is established, one of the two pathways may be dropped as part of the negotiations. Once the communications pathway 130 is established, client devices 102 and 104 may exchange data using the pathway 130.

Figure 2:
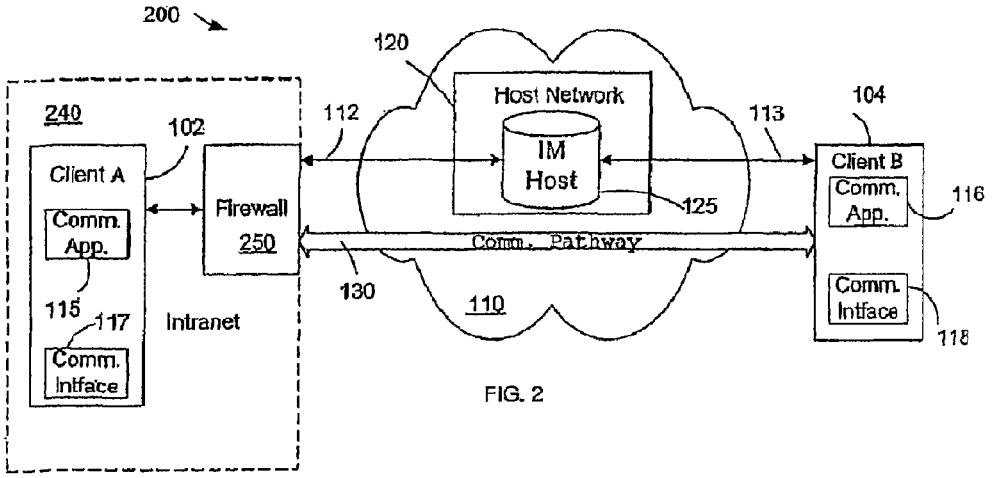

As shown in FIG. 2, a communications system 200 includes client A device 102 connected to an intranet 240 or other system configuration that includes a firewall 250 (or other device, such as a server performing filtering or network address translation). The firewall 250 may enforce an access control policy between the intranet 240 and the external network 110, and provides at least two basic mechanisms: one to block traffic and the other to permit traffic. The firewall 250 maybe implemented by one or more applications running on the client device (e.g., a personal firewall) or one or more separate devices, such as, for example, a router. The firewall 250 may provide one or more functions, such as packet filtering, network address translation (NAT), and proxy services. In addition, the firewall may provide encrypted authentication and virtual private networking, in addition to other features (e.g., content filtering and virus scanning).

If either client device 102 or 104 sends a message to the IM host 125, the IM host 125 determines whether the user associated with each client device is included in the user list of the other user. If each user is included in the list of the other user, the IM host 125 may provide the IP address/port of each client A device 102 and a shared secret to the other device. Each client device 102 and 104 may attempt to establish contact with the other client device.

However, as shown in FIG. 2, client B device 104 is not able to establish contact with client A device 102 because the IP address provided by the IM host 125 does not result in a connection. For example, if the IM host 125 provides the IP address and port number of client A device 102, an error is generated because the IP address is a local IP address of the intranet 240 (and not understood by devices outside of the intranet 240. If the IP address/port of the firewall 250 is provided, the firewall 250 blocks any connection attempted by client B device 104 because the firewall 250 expects a message from the IP address of the IM host 125 (which is different than that of client B device 104).

Notwithstanding the difficulties that may be encountered establishing a connection due to the firewall associated with client A device 102, the communications pathway 130 from client A device 102 to client B device 104 may established. For instance, client A device 102 may contact client B device 104 at the specified IP address/port and present the shared secret to client B device 104 to prove the identity of client A device 102, which client B device 104 verifies. Then, the client devices 102 and 104 may enter negotiations to establish the details of the communications pathway 130.

In another implementation of the communications system 200, when an instant message is sent to either client device, the IM host 125 may determine that the IP address and port associated with client A device 102 does not match the actual IP address being used to establish communications (e.g., because firewall 250 substitutes the local IP address with a global IP address of the firewall 250). From this information, the IM host 125 may be configured to deduce that the client A device 102 is behind a firewall (or similar device). Through a similar process, the IM host 125 may determine that the client B device 104 is not behind a firewall. In this case, if an attempt is made to establish a communications pathway 130 by either client device, the IM host 125 may send a message to the client A device 102 that provides the IP address and port of the client B device 104 and a shared secret, and also may send the shared secret to client B device 104 to facilitate communications. Client A device 102 then proceeds to contact client B device 104 and establish a communications pathway 130 as described above.

Figure 3:
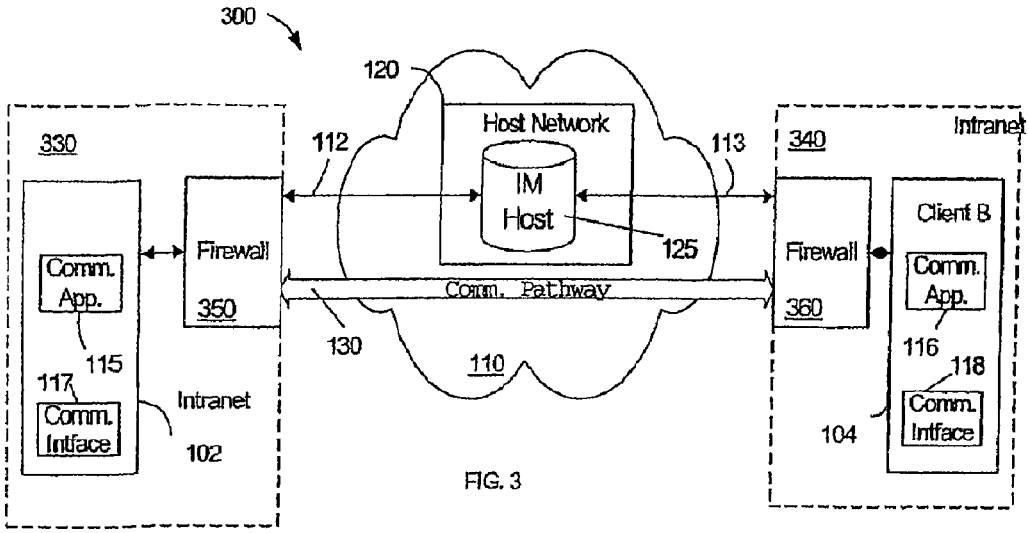

As shown in FIG. 3, a communications system 300 includes client devices 102 and 104 that are both connected to respective intranets 330 and 340, or otherwise behind firewalls (or other NAT devices). Client A device 102 connects to firewall 350 to access the external network 110 using communications link 112. Similarly, client B device 104 connects to firewall 360 to access the external network 110. Although firewalls 350 and 360 are shown as separate elements of the intranets 330 and 340, the firewalls also maybe implemented by client devices 102 and 104.

If a message is sent by user A to user B, the IM host 125 may determine that user A is listed on the user list of user B (or a group of the list of user B), and that user B is listed on the user list of user A (or a group of the list user A). Based on this determination, the IM host 125 may infer that user A and user B have implicitly granted access to each other. If the IM host 125 attempts to give the local IP address or the global IP address of the associated firewall of either client A device 102 or 104 to the other, a communications pathway 130 may not result for the reasons explained above with regard to FIG. 2. However, this implementation may provide a connection as follows.

First, the IM host 125 may determine that a direct connection cannot be made by the client devices. For example, the IM host 125 may determine that the global IP addresses used to establish communications with the IM host 125 do not match the local IP addresses purported to be used by the IM applications of the client devices. The IM host 125 also may determine that direct connection may not be made as a default because all other attempts to establish a communications pathway fail. In either case, the IM host 125 may inform one client device (e.g., client A device 102) that a direct connection may not be established, whether or not it is physically impossible to achieve such a connection.

In this instance, the communications application 115 of client A device 102 may contact the firewall 350 and request that the firewall 350 open a hole. For example, the communications application 115 may request that the firewall 350 create a proxy forward to pass traffic from client B device 104 to client A device 102. The firewall 350 randomly selects a port number and replies to the communication application 115 of client A device 102 with the selected port number and the public IP address of the firewall 350. The selected IP address/port data effectively designate a hole in firewall 350 that may be opened to allow direct communications with client A device 102.

The communications application 115 may provide the selected IP address/port data to the IM host 125. The IM host 125 sends the selected IP address/port data to the communications application 116 of client B device 104 along with a shared secret. The IM host 125 also provides the IP address of firewall 360 to the communications application 115 of client A device 102 along with the shared secret. The communications application 115 passes the IP address of firewall 360 to firewall 350. Firewall 350 opens the hole only for firewall 360 using the IP address of firewall 360.

The communications application 116 of client B device 104 connects to the specified IP address and port of firewall 350 (through firewall 360). As a result, the traffic from the communications application 116 arriving at the firewall 350 appears to originate from firewall 360, and the traffic is proxied forward to the communications application 115 of client A device 102. The communications application 115 may verify the identity of client B device 104 using the shared secret. Communications applications 115 and 116 may negotiate the details of the communications pathway 130 (e.g., a VPN) and establish the communications pathway 130.

Figure 4:
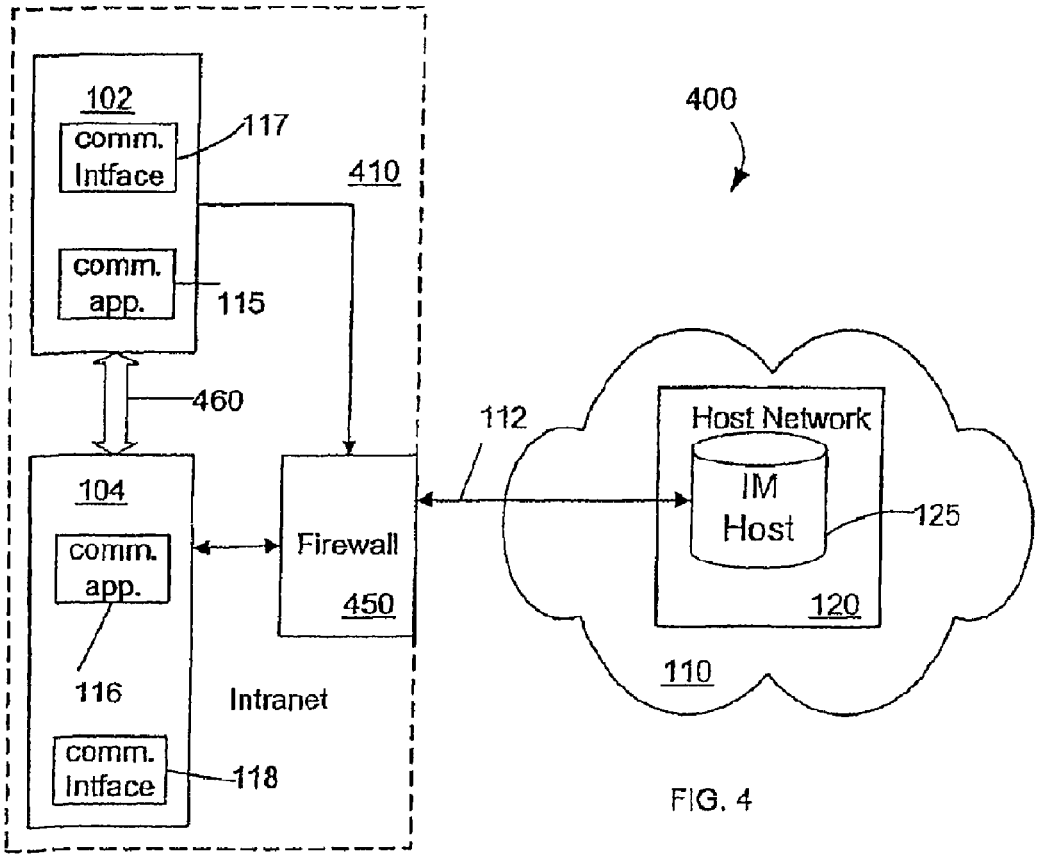

FIG. 4 shows a communications system 400 that includes an intranet 410 in which both client A device 102 and client B device 104 are located behind a firewall 450. However, even though the client devices 102 and 104 are behind the firewall 450, the local IP address and port of each client device allow direct communications between the client devices to be established because the local IP address information is recognized by devices within the intranet 410. In this case, a communications pathway 460 may be directly established by the client devices using the infrastructure of the intranet 410 in a manner as described with regard to FIG. 1 above.

The IM user interface may include a feature or setting to allow a user to block one or more users, a group of users, or all users on the user list from establishing a communications pathway. In addition, the IM user interface may include a setting to disable or prohibit the IM application from establishing any communications pathway regardless of whether each of two users includes the other user on their user lists. The IM user interface also may be configured to allow the communication pathway to be established for a specified group of users on the list (e.g., a user category, such as buddies, family, coworkers, and/or gamers).

Figure 5:
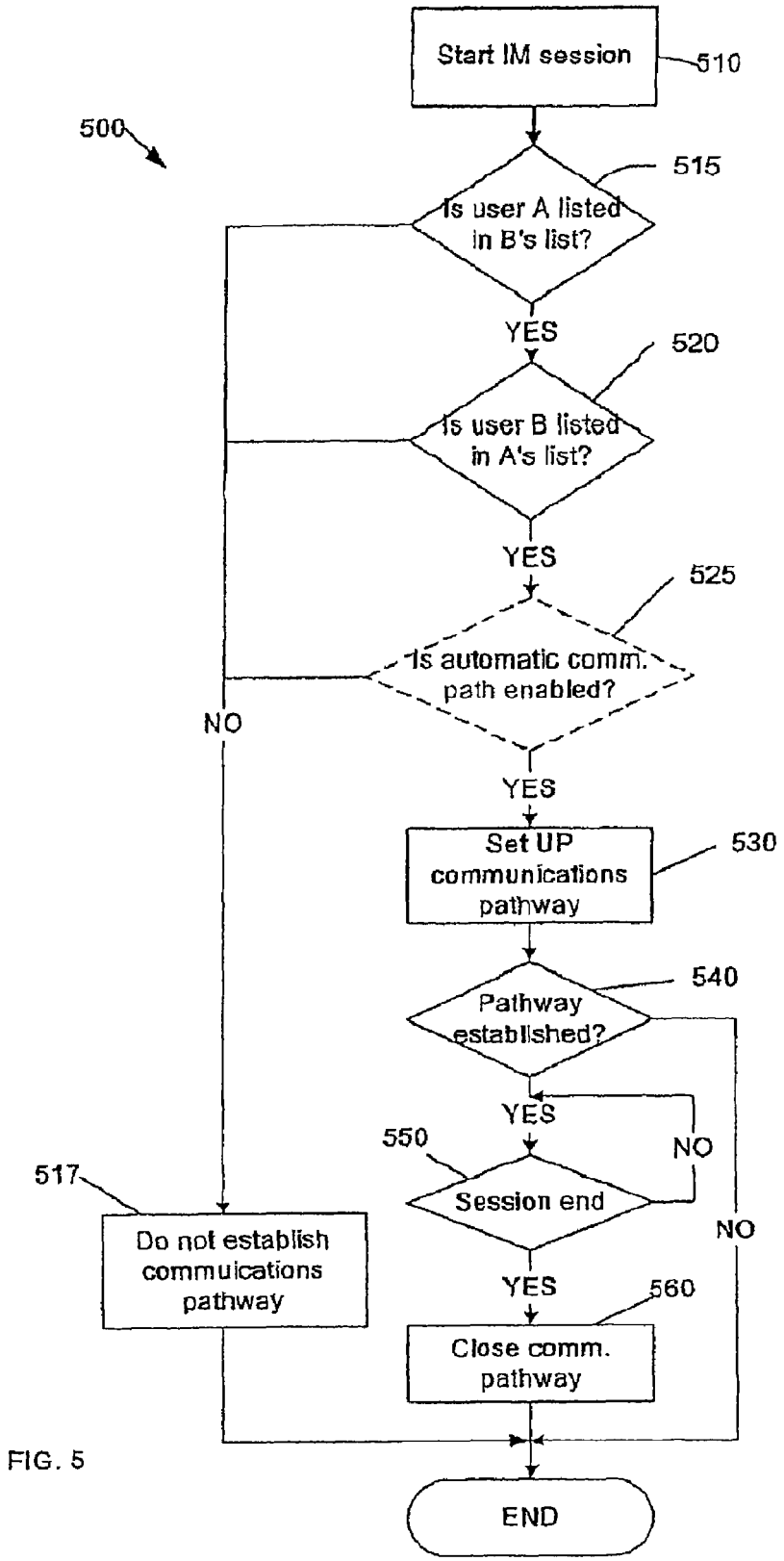
FIGS. 5 and 6 are flow charts of an exemplary process used to establish implicit communications.

FIG. 5 shows an exemplary process 500 to establish a communications pathway (e.g., a VPN). Initially, a user A starts an IM session (510). A determination is made as to whether user A is included in the list of user B (515). If not, a VPN is not established (517).

If user A is in the list of user B, a determination is made as to whether user B is in the list of user A (520). If not, a VPN is not established (517).

Optionally, a determination may be made whether automatic VPN connections are enabled (525). If not, a VPN is not established (517).

If user B is in the list of user A and the automatic VPN connections are enabled, then an attempt to establish a VPN (530) is made as described below with respect to FIG. 6. If the VPN is established (540), the VPN is maintained until the IM session is over, either client device requests that the VPN be closed, or either client device disconnects from the external network (550). Once the IM session is finished, the VPN is closed (560).

Figure 6:
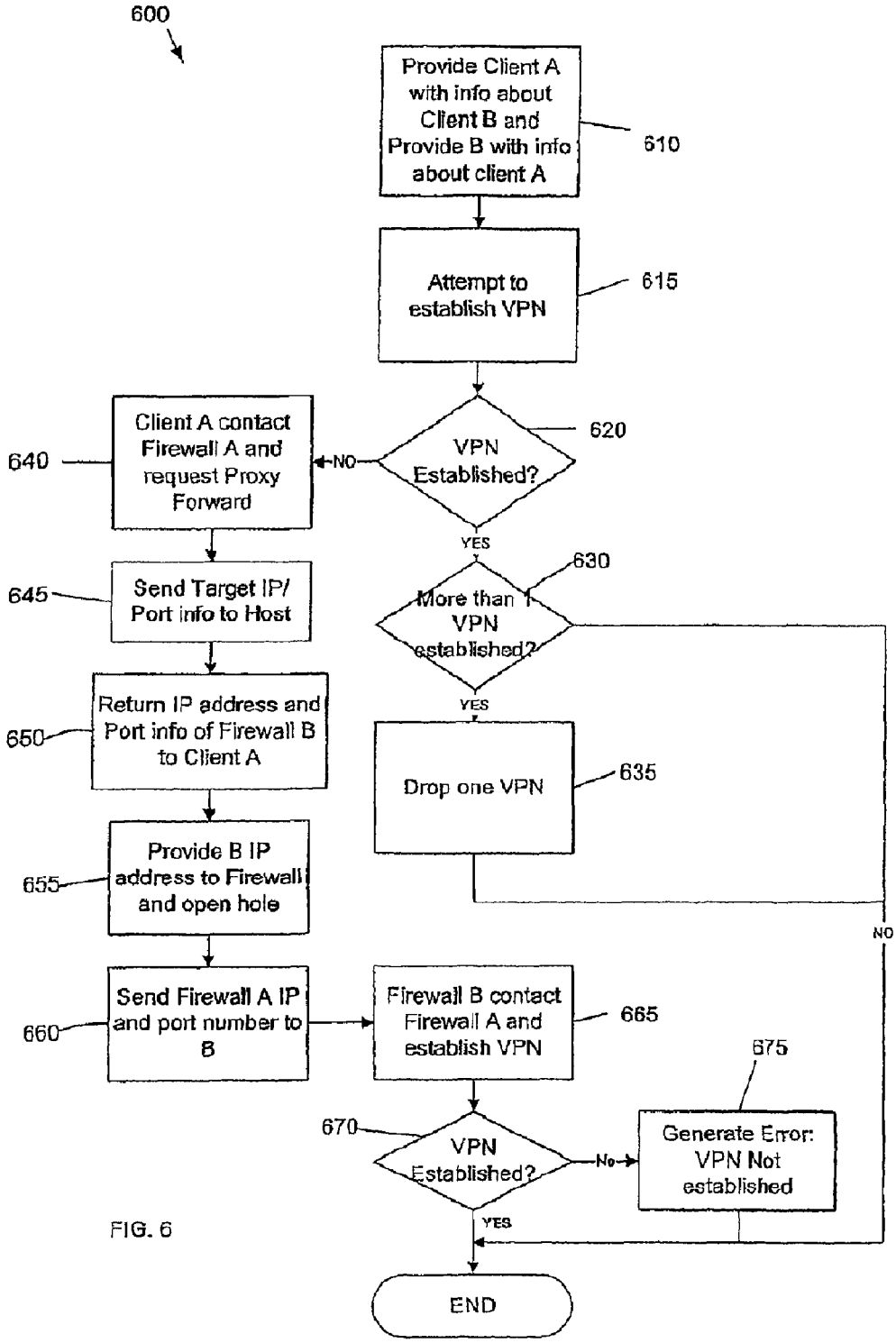

FIG. 6 shows an exemplary a process 600 for setting up or establishing a communications pathway, such as a VPN. First, the IM host provides information about each client device (e.g., the client's IP address, port, and a shared secret that may be used to authenticate user/client identity) to the client devices (610). After receiving the information, each client may attempt to establish a VPN using the information (615), for example, by contacting the IP address/port provided and offering the shared secret for validation/authentication. If either client device is able to contact the other client device using the information, the VPN may be established as negotiated between the client devices.

Upon determining that a VPN was established (620), a determination is made as to whether more than one VPN was established (e.g., both clients were able to contact each other with the information provided and therefore established two VPNs) (630). If more than one VPN was established between the clients, one of the two VPNs is dropped during the negotiations (635).

Upon determining that a VPN was not established (620), one of the client devices (e.g., client A device 102) may contact its firewall to request a proxy forward be created for the other client device (e.g., client B device 104) (640). The client A device 102 receives a target public IP address and random port number selected by its associated firewall. Client device A sends the target IP/Port information to a host (645). The host returns the public IP address of the firewall of client B device 104 (650). Client device A provides the IP address to its firewall, which opens a hole in the firewall for the firewall of client B (655). The host sends the target IP/port information to the firewall of client B (660). The firewall of client B contacts firewall of client A to establish a VPN (665). If a VPN is not established (670), an error message is generated (675) (e.g., automatic VPN could not be configured).

Figure 7:
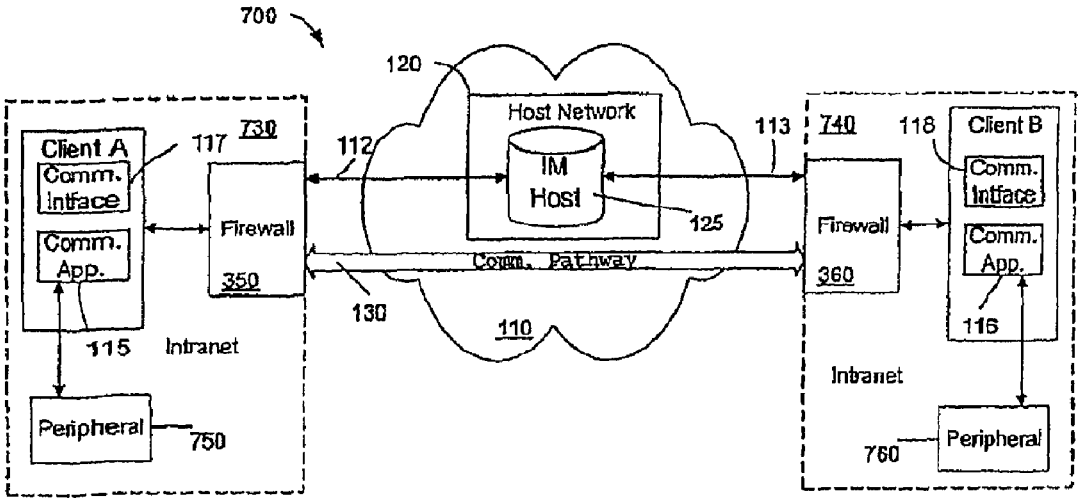

As shown in FIG. 7, a communications system 700 includes client devices 102 and 104 connected to an external network 110. In addition, peripheral devices 750 and 760 (e.g., a gaming device, such as an X-Box™ or Playstation™) are connected to each client device 110. The peripheral devices 750 and 760 may employ an exploring application to determine whether they are connected to any other peripheral devices. If another gaming device is detected, the gaming devices 750 and 760 may establish a connection using a data exchange protocol.

In the implementation shown in FIG. 7, the local communications applications 115 and 116 on the client devices 102 and 104 may be programmed to mimic the data exchange protocol of the peripheral devices (e.g., to appear as peripheral devices). Client devices 102 and 104 (using the communications application on each client device) may automatically establish a communications pathway (e.g., VPN) as described above. As a result, the peripheral devices 750 and 760 may exchange data (e.g., game data that is used to play a multiplayer/device game) with the communications applications as if the communications application were another peripheral device. The communications application 115 may pass the data to the other communications application 116 using the communications pathway 130. The other communications application 116 passes the data to its connected peripheral device 760. As a result, an automatic (or configurable) communications link may be established between the peripheral devices (e.g., to play a game). To the peripheral devices 750 and 760, it appears as if each device is communicating with another local peripheral device.

A number of exemplary implementations have been described. Nevertheless, it is understood that various modifications may be made. For example, suitable results may be achieved if the steps of the disclosed techniques are performed in a different order and/or if components in a disclosed architecture, device, or circuit are combined in a different manner and/or replaced or supplemented by other components. Accordingly, other implementations are within the scope of the following claims.

What is claimed is:

1. A method comprising:

logging, *by a server,* a first client device into [a] *the* server;

logging, *by the server,* a second client device into the server;

accessing, [using] *by* the server, a first user list associated with a first user of the first client device;

accessing, [using] *by* the server, a second user list associated with a second user of the second client device[, wherein the first user list and the second user list are maintained separately from one another];

analyzing, [using] *by* the server, the accessed first user list to determine whether an identifier of the second user is included in the first user list;

analyzing, [using] *by* the server, the accessed second user list to determine whether an identifier of the first user is included in the second user list; *and* regulating, [using] *by* the server, [a communications pathway] *communications* between the first client device and the second client device based on both the determination of whether the identifier of the first user is included on the second user list and the determination of whether the identifier of the second user is included on the first user list.

2. The method of claim 1 wherein regulating [the communications pathway] *communications* includes establishing a virtual private network.

3. The method of claim 1 wherein regulating [the communications pathway] *communications* includes establishing a peer-to-peer connection between the first client device and the second client device.

4. The method of claim 1 wherein the first user list and the second user list comprise lists of identities for whom online presence is monitored.

5. The method of claim 1 further comprising receiving, at the server, a request from a first communications program executing on the first client device to establish [a communications pathway] *communication* with a second communications program executing on the second client device, wherein:

analyzing, [using] *by* the server, the accessed first user list to determine whether the identifier of the second user is included in the first user list comprises analyzing, using the server, the accessed first user list to determine whether the identifier of the second user is included in the first user list in response to receiving the request;

analyzing, [using] *by* the server, the accessed second user list to determine whether the identifier of the first user is included in the second user list comprises analyzing, using the server, the accessed second user list to determine whether the identifier of the first user is included in the second user list in response to receiving the request; and regulating [the communications pathway] *communications between the first client device and the second client device* comprises establishing [the communications pathway] *one or more communication types or pathways* between the first communications program and the second communications program.

6. The method of claim 1 further comprising receiving a message from a first communications application executing on the first client device directed to a second communications application executing on the second client device, wherein:

analyzing, [using] *by* the server, the accessed first user list to determine whether the identifier of the second user is included in the first user list comprises analyzing, [using] *by* the server, the accessed first user list to determine whether the identifier of the second user is included in the first user list in response to receiving the message;

analyzing, [using] *by* the server, the accessed second user list to determine whether the identifier of the first user is included in the second user list comprises analyzing, [using] *by* the server, the accessed second user list to determine whether the identifier of the first user is included in the second user list in response to receiving the message; and regulating [the communications pathway] *communications between the first client device and the second client device* comprises establishing [the communications pathway] *one or more communication types or pathways* between the first communications program and the second communications program.

7. The method of claim 1, wherein regulating, [using] *by* the server, [a communications pathway] *communications* between the first client device and the second client device, comprises automatically establishing [a communications pathway] *one or more communication types or pathways* between the first client device and the second client device.

8. The method of claim 1, wherein regulating, [using] *by* the server, [a communications pathway] *communications* between the first client device and the second client device, comprises sending a shared secret to the first client device and the second device, which enables the first client device and the second client device to authenticate themselves.

9. A system comprising:

[a first client device;]

[a second client device; and]

a server [configured to] *that*:

[access] *accesses* a first user list associated with a first user of [the] *a* first client device;

[access] *accesses* a second user list associated with a second user of [the] *a* second client device[, wherein the first user list and the second user list are maintained separately from one another];

[analyze] *analyzes* the accessed first user list to determine whether an identifier of the second user is included in the first user list;

[analyze] *analyzes* the accessed second user list to determine whether an identifier of the first user is included in the second user list; and

[regulate a communications pathway] *regulates communications* between the first client device and the second client device based on both the determination of whether the identifier of the first user is included on the second user list and the determination of whether the identifier of the second user is included on the first user list.

10. The system of claim 9 wherein, to regulate [the communications pathway] *communications between the first client device and the second client device*, the server [is configured to establish] *establishes* a virtual private network.

11. The system of claim 9 wherein, to regulate [the communications pathway] *communications between the first client device and the second client device*, the server [is configured to establish] *establishes* a peer-to-peer connection between the first client device and the second client device.

12. The system of claim 9 wherein the first user list and the second user list comprise lists of identities for whom online presence is monitored.

13. The system of claim 9 wherein:

the server [is configured to receive] *receives* a request from a first communications program executing on the first client device to establish [a communications pathway] *communications* with a second communications program executing on the second client device;

to analyze the accessed first user list to determine whether the identifier of the second user is included in the first user list, the server [is configured to analyze] *analyzes* the accessed first user list to determine whether the identifier of the second user is included in the first user list in response to receiving the request;

to analyze the accessed second user list to determine whether the identifier of the first user is included in the second user list the server [is configured to analyze] *analyzes* the accessed second user list to determine whether the identifier of the first user is included in the second user list in response to receiving the request; and to regulate [the communications pathway] *communications between the first client device and the second client device*, the server [is configured to establish the communications pathway] *establishes one or more communication types or pathways* between the first communications program and the second communications program.

14. The system of claim 9 wherein:

the server [is configured to receive] *receives* a message from a first communications application executing on the first client device directed to a second communications application executing on the second client device;

to analyze the accessed first user list to determine whether the identifier of the second user is included in the first user list, the server [is configured to analyze] *analyzes* the accessed first user list to determine whether the identifier of the second user is included in the first user list in response to receiving the message;

to analyze the accessed second user list to determine whether the identifier of the first user is included in the second user list, the server [is configured to analyze] *analyzes* the accessed second user list to determine whether the identifier of the first user is included in the second user list in response to receiving the message; and to regulate [the communications pathway] *communications between the first client device and the second client device*, the server [is configured to establish the communications pathway] *establishes one or more communication types or pathways* between the first communications program and the second communications program.

15. The system of claim 9, wherein the server [is further configured to] automatically [establish a communications pathway] *establishes one or more communications types or pathways* between the first client device and the second client device.

16. The system of claim 9, wherein the server [is further configured to send] *sends* a shared secret to the first client device and the second device, which enables the first client device and the second client device to authenticate themselves.

17. A host system comprising:

an interface to receive a communication from a first client device associated with a first user and to transmit a communication to a second client device associated with a second user;

storage to store a first user list associated with the first user and to store a second user list associated with the second user; and a [host configured to] *server that*:

[determine] *determines* an identifier of the first user and an identifier of the second user;

[access] *accesses* the first user list associated with the first user of the first client device;

[access] *accesses* the second user list associated with the second user of the second client device[, wherein the first user list and the second user list are maintained separately from one another];

[analyze] *analyzes* the accessed first user list to determine whether an identifier of the second user is included in the first user list;

[analyze] *analyzes* the accessed second user list to determine whether an identifier of the first user is included in the second user list; and

[regulate a communications pathway] *regulates communications* between the first client device and the second client device based on both the determination of whether the identifier of the first user is included on the second user list and the determination of whether the identifier of the second user is included on the first user list.

18. The system of claim 17 wherein, to regulate [the communications pathway] *communications between the first client device and the second client device*, the [host is configured to establish] *server establishes* a virtual private network.

19. The system of claim 17 wherein, to regulate [the communications pathway] *communications between the first client device and the second client device*, the [host is configured to establish] *server establishes* a peer-to-peer connection between the first client device and the second client device.

20. The system of claim 17 wherein the first user list and the second user list comprise lists of identities for whom online presence is monitored.

21. The system of claim 17 wherein:

the communication from the first client device is a request received from a first communications program executing on the first client device to establish [a communications pathway] *communications* with a second communications program executing on the second client device;

to analyze the accessed first user list to determine whether the identifier of the second user is included in the first user list, the [host is configured to analyze] *server analyzes* the accessed first user list to determine whether the identifier of the second user is included in the first user list in response to receiving the request;

to analyze the accessed second user list to determine whether the identifier of the first user is included in the second user list, the [host is configured to analyze] *server analyzes* the accessed second user list to determine whether the identifier of the first user is included in the second user list in response to receiving the request; and to regulate [the communications pathway] *communications between the first client device and the second client device*, the [host is configured to establish the communications pathway] *server establishes one or more communication types or pathways* between the first communications program and the second communications program.

22. The system of claim 17 wherein:

the communication from the first client device is a message from a first communications application executing on the first client device directed to a second communications application executing on the second client device;

to analyze the accessed first user list to determine whether the identifier of the second user is included in the first user list, the [host is configured to analyze] *server analyzes* the accessed first user list to determine whether the identifier of the second user is included in the first user list in response to receiving the message;

to analyze the accessed second user list to determine whether the identifier of the first user is included in the second user list the [host is configured to analyze] *server analyzes* the accessed second user list to determine whether the identifier of the first user is included in the second user list in response to receiving the message; and to regulate [the communications pathway] *communications between the first client device and the second client device*, the [host is configured to establish the communications pathway] *server establishes one or more communication types or pathways* between the first communications program and the second communications program.

23. The system of claim 17, wherein the host [is further configured to] *server* automatically [establish a communications pathway] *establishes one or more communications types or pathways* between the first client device and the second client device.

24. The system of claim 17, wherein the [host is further configured to send] *server sends* a shared secret to the first client device and the second device, which enables the first client device and the second client device to authenticate themselves.

*25. The method of claim 1, wherein regulating communications between the first client device and the second client device comprises establishing one or more communication pathways.*

*26. The method of claim 25, wherein establishing one or more communication pathways comprises simultaneously establishing a first communications type or pathway and a second communications type or pathway between the first client device and the second client device based on the determination of whether the identifier of the first user is included on the second user list and the determination of whether the identifier of the second user is included on the first user list.*

*27. The method of claim 1, wherein regulating communications between the first client device and the second client device comprises allowing the first client and the second client to view whether or not other users are online, exchange instant messages, participate in group chat rooms, trade files, find other users with similar interests, get customized news and stock quotes, or search the World Wide Web.*

*28. The system of claim 9, wherein regulating communications between the first client device and the second client device comprises establishing one or more communication pathways.*

*29. The system of claim 28, wherein establishing one or more communication pathways comprises simultaneously establishing a first communications type or pathway and a second communications type or pathway between the first client device and the second client device based on the determination of whether the identifier of the first user is included on the second user list and the determination of whether the identifier of the second user is included on the first user list.*

*30. The system of claim 9, wherein regulating communications between the first client device and the second client device comprises allowing the first client and the second client to view whether or not other users are online, exchange instant messages, participate in group chat rooms, trade files, find other users with similar interests, get customized news and stock quotes, or search the World Wide Web.*

*31. The system of claim 17, wherein regulating communications between the first client device and the second client device comprises establishing one or more communication pathways.*

*32. The system of claim 31, wherein establishing one or more communication pathways comprises simultaneously establishing a first communications type or pathway and a second communications type or pathway between the first client device and the second client device based on the determination of whether the identifier of the first user is included on the second user list and the determination of whether the identifier of the second user is included on the first user list.*

*33. The system of claim 17, wherein regulating communications between the first client device and the second client device comprises allowing the first client and the second client to view whether or not other users are online, exchange instant messages, participate in group chat rooms, trade files, find other users with similar interests, get customized news and stock quotes, or search the World Wide Web.*

* * * * *